US010320663B2

(12) United States Patent
Kawazoe et al.

(10) Patent No.: US 10,320,663 B2
(45) Date of Patent: Jun. 11, 2019

(54) COMMUNICATION DEVICE, COMMUNICATION SYSTEM, AND COMPUTER PROGRAM PRODUCT FOR PERFORMING INTERACTIVE COMMUNICATION VIA RELAY SERVERS

(71) Applicant: Kabushiki Kaisha Toshiba, Minato-ku (JP)

(72) Inventors: Hiroshi Kawazoe, Kawasaki (JP); Daisuke Ajitomi, Setagaya (JP); Keisuke Minami, Kawasaki (JP); Hiroyuki Aizu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 128 days.

(21) Appl. No.: 15/257,169

(22) Filed: Sep. 6, 2016

(65) Prior Publication Data

US 2017/0222919 A1 Aug. 3, 2017

(30) Foreign Application Priority Data

Jan. 28, 2016 (JP) ................................. 2016-014859

(51) Int. Cl.
*H04L 12/721* (2013.01)
*H04L 12/801* (2013.01)
(Continued)

(52) U.S. Cl.
CPC ............ *H04L 45/44* (2013.01); *H04L 47/193* (2013.01); *H04L 47/2441* (2013.01);
(Continued)

(58) Field of Classification Search
CPC ..... H04L 45/44; H04L 67/141; H04L 67/143; H04L 45/24; H04L 45/74; H04L 47/2441; H04L 47/193
See application file for complete search history.

(56) References Cited

U.S. PATENT DOCUMENTS 6,272,148 B1 * 8/2001 Takagi .................. H04L 1/1858
370/469
2005/0265284 A1 * 12/2005 Hsu ....................... H04W 28/06
370/331
(Continued)

FOREIGN PATENT DOCUMENTS

JP 2008-225644 A 9/2008
JP 2008-311852 A 12/2008
(Continued)

OTHER PUBLICATIONS

I. Fette, et al., "The WebSocket Protocol" Internet Engineering Task Force (IETF), RFC 6455, Dec. 2011, pp. 1-71.

*Primary Examiner* — Timothy J Weidner
(74) *Attorney, Agent, or Firm* — Oblon, McClelland, Maier & Neustadt, L.L.P.

(57) ABSTRACT

A communication device according to an embodiment performs communications with one or more devices via a relay server. To switch a connection destination from a first relay server serving as an origin to a second relay server serving as a destination, the communication device establishes a connection with the second relay server, switches a transmission destination of a message from the first relay server to the second relay server, and cuts a connection with the first relay server.

8 Claims, 15 Drawing Sheets

(51) Int. Cl.
*H04L 12/851* (2013.01)
*H04L 29/08* (2006.01)

(52) U.S. Cl.
CPC .......... *H04L 67/141* (2013.01); *H04L 67/142* (2013.01); *H04L 67/143* (2013.01)

(56) References Cited

U.S. PATENT DOCUMENTS

| | | | | |
|---|---|---|---|---|
| 2011/0242971 | A1* | 10/2011 | Kokado | H04L 61/2582 370/226 |
| 2014/0052986 | A1* | 2/2014 | Kanai | H04L 63/0428 713/168 |
| 2015/0256622 | A1* | 9/2015 | Kawazoe | H04L 67/1097 709/227 |
| 2016/0142477 | A1 | 5/2016 | Kawazoe et al. | |

FOREIGN PATENT DOCUMENTS

| | | |
|---|---|---|
| JP | 2011-77890 A | 4/2011 |
| JP | 2016-95645 A | 5/2016 |

* cited by examiner

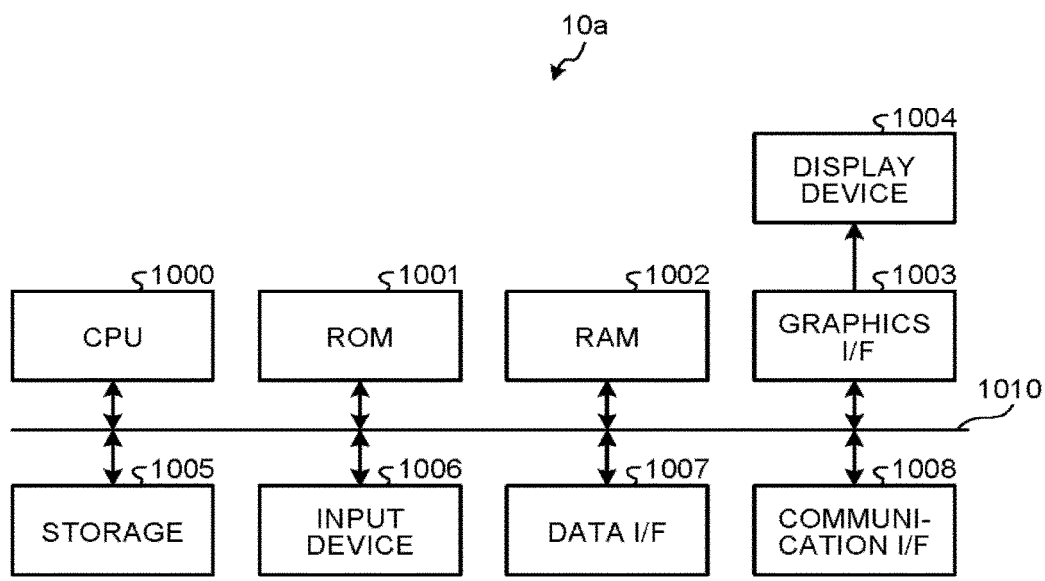
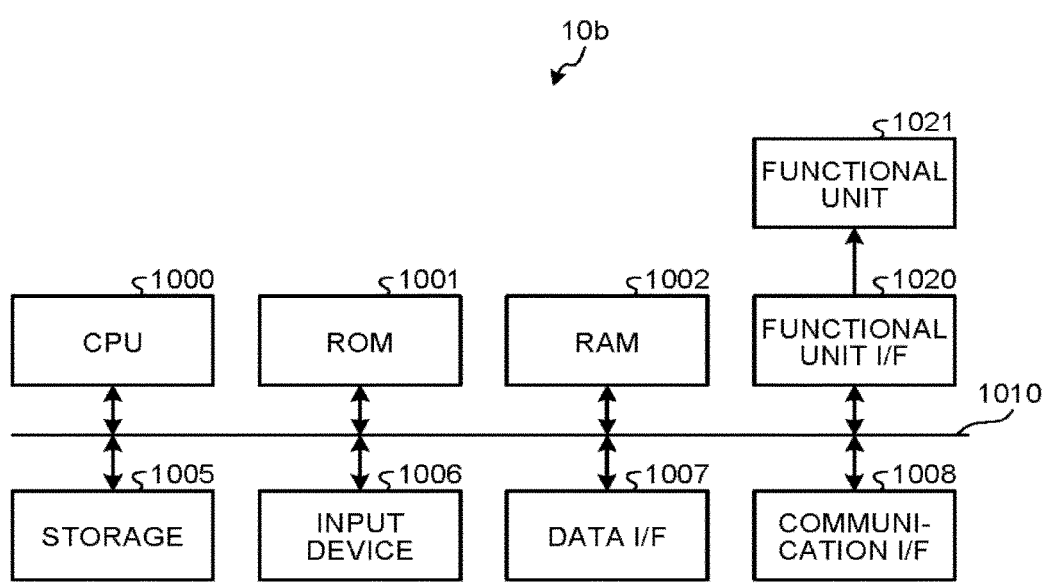

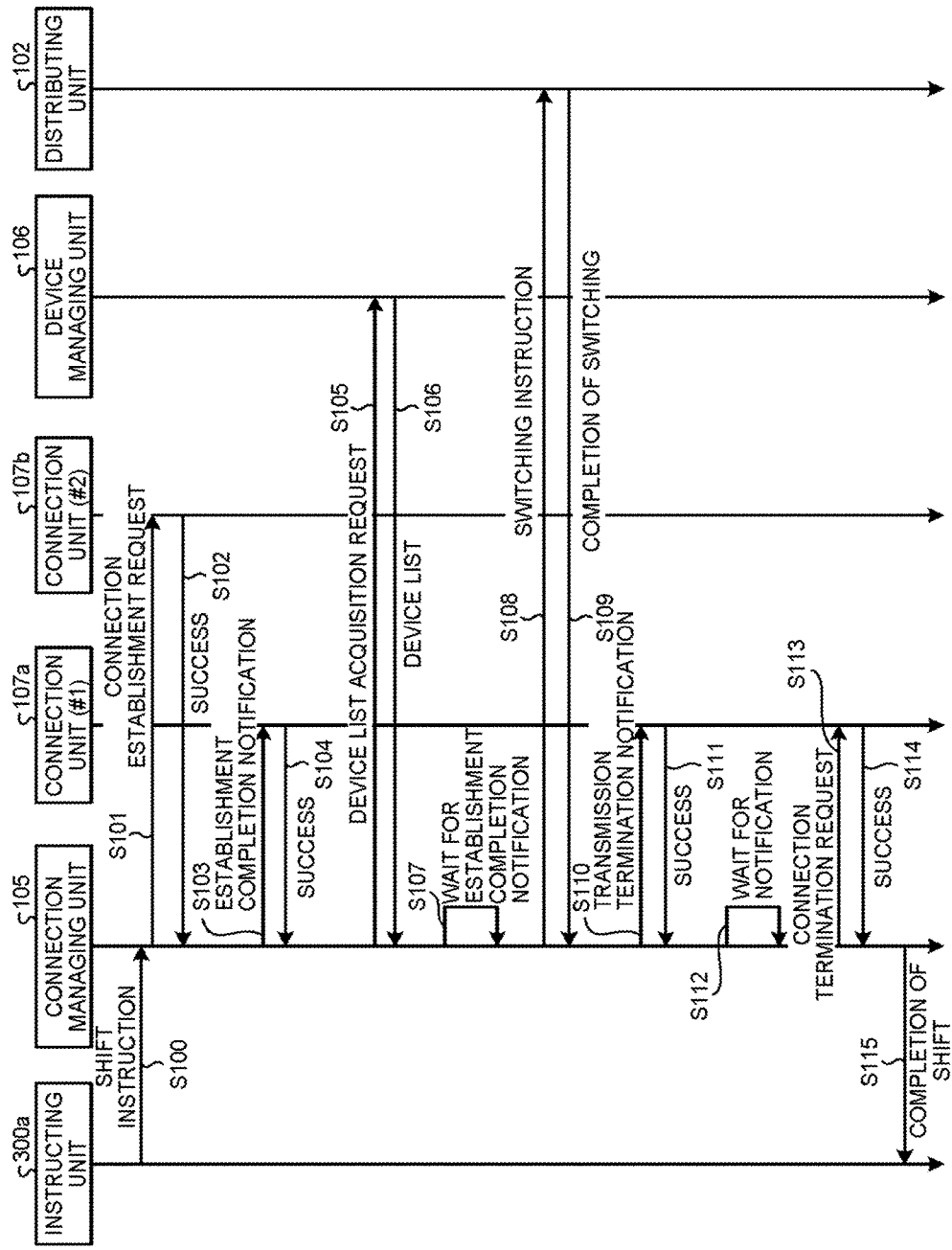

COMMUNICATION DEVICE, COMMUNICATION SYSTEM, AND COMPUTER PROGRAM PRODUCT FOR PERFORMING INTERACTIVE COMMUNICATION VIA RELAY SERVERS

CROSS-REFERENCE TO RELATED APPLICATIONS

This application is based upon and claims the benefit of priority from Japanese Patent Application No. 2016-014859, filed on Jan. 28, 2016; the entire contents of which are incorporated herein by reference.

FIELD

Embodiments described herein relate generally to a communication device, a communication system, and a computer program product.

BACKGROUND

Widely known are interactive communication systems in which a plurality of client devices are connected to one another via a relay server on the Internet (e.g., Japanese Patent Application Laid-open No. 2011-077890 and Japanese Patent Application Laid-open No. 2008-311852). A first client device out of the client devices establishes a connection with the relay server and maintains the connected state. A second client device also establishes a connection with the relay server. When the first client device, for example, outputs a message after the connection is established between the first and the second client devices and the relay server, the relay server transfers the message to the second client device. In a case where the number of client devices increases, a plurality of relay servers may be provided.

In such interactive communication systems, a certain number of relay servers out of the relay servers may possibly be shut down (referred to as scale-in). The interactive communication systems execute scale-in at times when fewer users use the systems, such as night-time, to reduce power consumption or carry out maintenance of the relay servers.

When the conventional interactive communication systems described above execute scale-in, there is such a problem that client devices connected to the relay servers to be shut down are momentarily incapable of performing communications.

Specifically, when a relay server is shut down, client devices connected to the relay server fail to perform communications if they remain in that state. The client devices need to be switched to another available relay server. After the relay servers are switched, a client device serving as a transmitter of a message and a client device serving as a receiver thereof fail to transmit and receive the message until both of them can establish a connection.

BRIEF DESCRIPTION OF THE DRAWINGS

FIG. 3 is a block diagram of an exemplary hardware configuration of a client device serving as an information processor;

FIG. 4 is a block diagram of an exemplary hardware configuration of a client device serving as a home device;

FIG. 11 is an exemplary sequence diagram of a process performed by the client device in the processing for shifting the relay servers according to the first embodiment;

DETAILED DESCRIPTION

A communication device according to an embodiment performs communications with one or more devices via a relay server. To switch a connection destination from a first relay server serving as an origin to a second relay server serving as a destination, the communication device establishes a connection with the second relay server, switches a transmission destination of a message from the first relay server to the second relay server, and cuts a connection with the first relay server.

Exemplary embodiments of a communication device, a communication system, and a computer program product are described below.

First Embodiment

Figure 1:
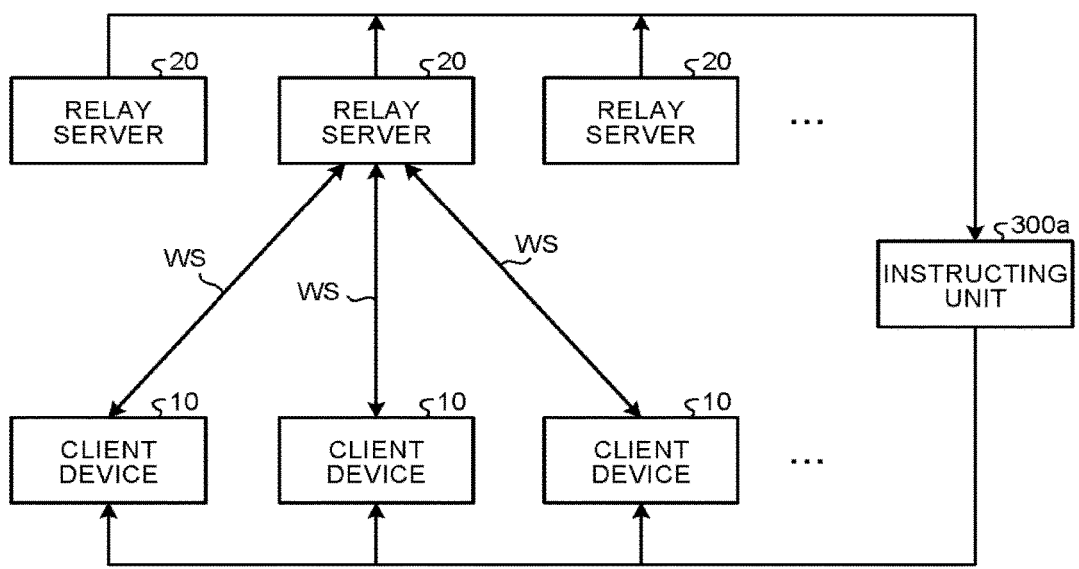
FIG. 1 is a block diagram schematically illustrating an exemplary configuration of a communication system applicable to a first embodiment.
Figure 2:
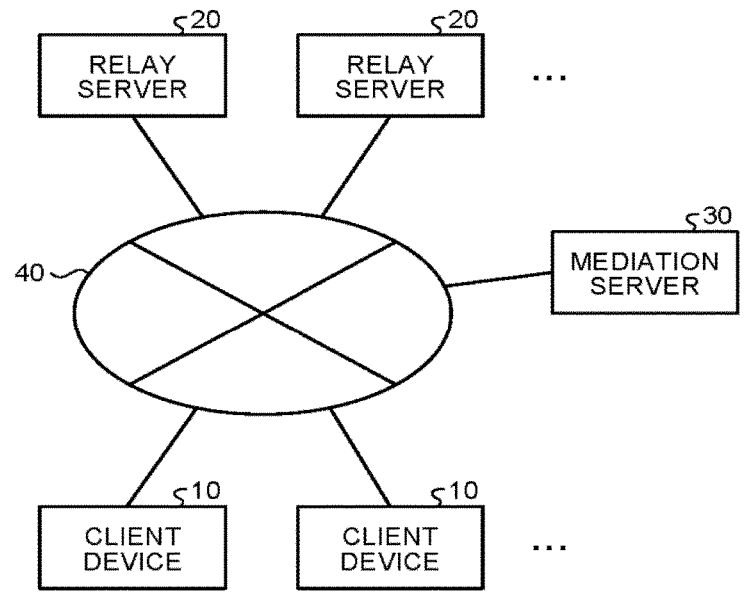
FIG. 2 is a block diagram more specifically illustrating the exemplary configuration of the communication system applicable to the first embodiment.

FIG. 1 schematically illustrates an exemplary configuration of a communication system applicable to a first embodiment. The communication system illustrated in FIG. 1 is a remote control system that controls equipment from a remote information terminal via a communication channel. The communication system 1 includes a plurality of client devices 10, a plurality of relay servers 20, and an instructing unit 300a. In an actual configuration of the communication system, as specifically illustrated in FIG. 2, for example, the client devices 10, the relay servers 20, and a mediation server 30 functioning as the instructing unit 300a are connected in a communicable manner with one another via a network 40, such as the Internet.

The client device 10 is a communication device and may be a smartphone (multifunctional mobile phone) or a tablet computer serving as a portable information processor, for example. The client device 10 is not limited thereto and may be a desktop computer. Alternatively, the client device 10 may be a device including a central processing unit (CPU) and a communication interface (I/F) and connectable to the network 40 out of home devices installed in a user's house, for example. Examples of the device include, but are not limited to, a video recorder, an air conditioner, etc.

The embodiments employ a protocol conforming to WebSocket as a protocol used by the client devices 10 and the relay servers 20 to perform interactive communications. WebSocket is developed by the Internet Engineering Task Force (IETF), and the specification of the protocol is disclosed as RFC6455 (refer to RFC 6455 The WebSocket Protocol, (searched on Dec. 8, 2015) (URL: http://tools.ietf.org/html/rfc6455)). The WebSocket Protocol operates on the Transmission Control Protocol (TCP).

The client device 10 functions as a WebSocket client. The relay server 20 functions as a WebSocket server. In the example illustrated in FIG. 1, a plurality of client devices 10 are connected to one of the relay servers 20 by WebSocket connections (represented by "WS" in FIG. 1).

FIGS. 3 and 4 illustrate exemplary hardware configurations of the client device 10. FIG. 3 illustrates an exemplary hardware configuration of a client device 10a serving as an information processor.

As illustrated in FIG. 3, the client device 10a includes a CPU 1000, a read only memory (ROM) 1001, a random access memory (RAM) 1002, a graphics I/F 1003, a display device 1004, a storage 1005, an input device 1006, a data I/F 1007, and a communication I/F 1008. These units are connected in a communicable manner with one another via a bus 1010.

The storage 1005 is a non-volatile memory, such as a hard disk drive and a flash memory, and stores therein a computer program and various types of data for operating the CPU 1000. The ROM 1001 stores therein in advance a computer program and data used to start the client device 10, for example. Based on the computer programs stored in the storage 1005 and the ROM 1001, the CPU 1000 controls the entire operation of the client device 10a using the RAM 1002 as a work memory.

The graphics I/F 1003 converts display information generated based on the computer program by the CPU 1000 into display signals and supplies them to the display device 1004. The display device 1004 includes a liquid-crystal display (LCD) and a drive circuit that drives the LCD, for example, and displays a screen based on the display signals supplied from the graphics I/F 1003. The input device 1006 outputs signals corresponding to a user operation. The input device 1006 may be a touch panel integrated with the display device 1004.

The data I/F 1007 inputs and outputs data from and to an external device and may be a universal serial bus (USB), for example. The communication I/F 1008 uses the Transmission Control Protocol/Internet Protocol (TCP/IP) as its communication protocol and controls communications via the network 40.

FIG. 4 illustrates an exemplary hardware configuration of a client device 10b serving as a home device. In FIG. 4, components common to those in FIG. 3 are denoted by same reference numerals, and detailed explanation thereof will be omitted. As illustrated in FIG. 4, the client device 10b includes the CPU 1000, the ROM 1001, the RAM 1002, the storage 1005, the input device 1006, the data I/F 1007, and the communication I/F 1008, a functional unit I/F 1020, a functional unit 1021. The client device 10b has a substantially same configuration as that of the client device 10a serving as an information processor illustrated in FIG. 3.

The client device 10b is different from the client device 10a in that it includes the functional unit I/F 1020 and the functional unit 1021 instead of the graphics I/F 1003 and the display device 1004. The functional unit 1021 provides functions as a home device of the client device 10b. In a case where the client device 10b is a video recorder, for example, the functional unit 1021 has a television signal receiving function or the like. The functional unit I/F 1020 is an interface of the CPU 1000 for the functional unit 1021.

Figure 5:
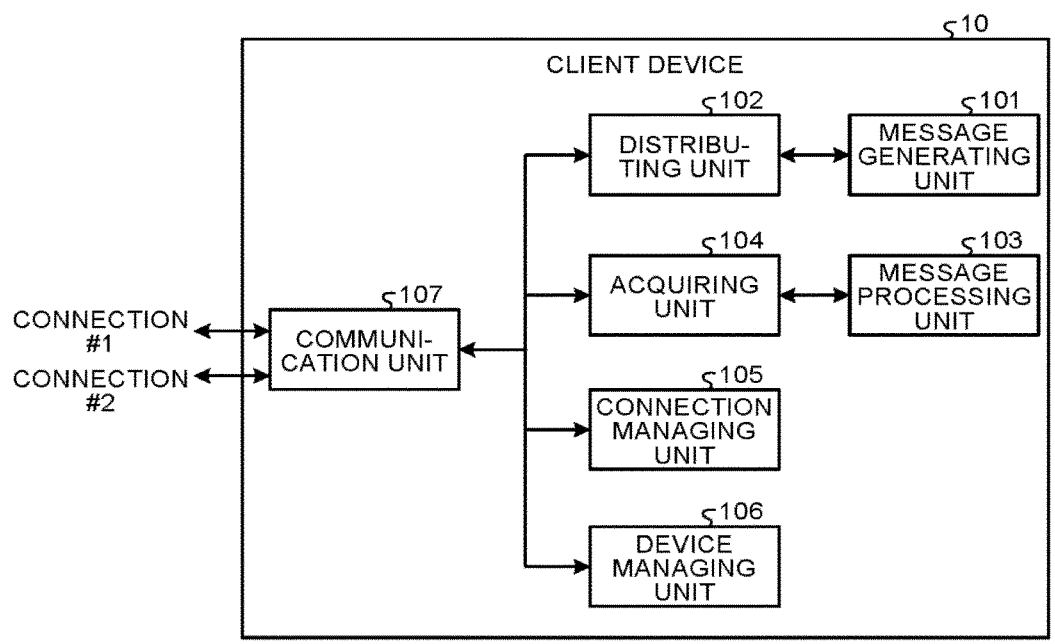
FIG. 5 is an exemplary functional block diagram for explaining functions of the client device according to the first embodiment.

FIG. 5 is an exemplary functional block diagram for explaining functions of the client device 10 according to the first embodiment. The configuration illustrated in FIG. 5 is applicable to both of the client device 10a serving as an information processor and the client device 10b serving as a home device.

As illustrated in FIG. 5, the client device 10 includes a message generating unit 101, a distributing unit 102, a message processing unit 103, an acquiring unit 104, a connection managing unit 105, a device managing unit 106, and a communication unit 107.

The message generating unit 101, the distributing unit 102, the message processing unit 103, the acquiring unit 104, the connection managing unit 105, the device managing unit 106, and the communication unit 107 are provided by a communication program that operates on the CPU 1000. The present embodiment, however, is not limited thereto, and part or all of the message generating unit 101, the distributing unit 102, the message processing unit 103, the acquiring unit 104, the connection managing unit 105, the device managing unit 106, and the communication unit 107 may be provided by hardware circuits that cooperate with one another.

Figure 6:
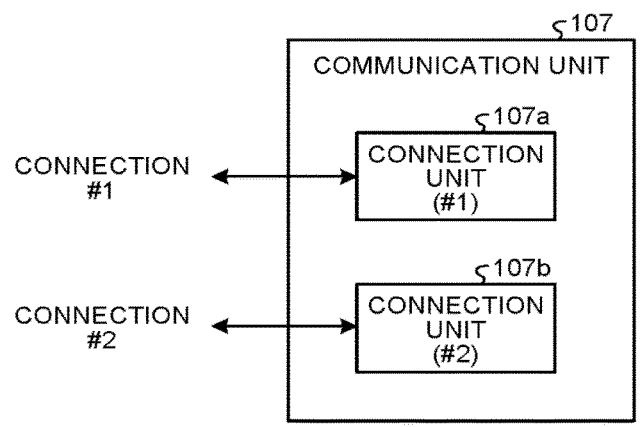
FIG. 6 is an exemplary functional block diagram for explaining functions of a communication unit according to the first embodiment.

As illustrated in FIG. 6, for example, the communication unit 107 includes connection units 107a and 107b identified by respective pieces of unique identification information (identification IDs). In FIG. 6, the connection units 107a and 107b are also referred to as a connection unit (#1) and a connection unit (#2), respectively. The connection units 107a and 107b correspond to WebSocket connections defined by RFC6455. The connection units 107a and 107b are formed in response to a connection request by WebSocket and establish the connection #1 and the connection #2, respectively, by WebSocket.

The message generating unit 101 generates a message to be transmitted from the client device 10 serving as a transmitter to the client device 10 serving as a receiver. In the remote control system, for example, the message generating unit 101 generates a message including a control command.

The distributing unit 102 transfers a message transmitted from the message generating unit 101 to the communication unit 107. The distributing unit 102 requests the communication unit 107 to transmit the message to any one of the relay servers 20. The distributing unit 102, for example, requests the communication unit 107 to transmit the message to one of a first relay server 20 and a second relay server 20 out of the relay servers 20. The distributing unit 102 receives the identification information on the connection unit 107a or the connection unit 107b serving as a destination from the connection managing unit 105 described below, thereby switching destinations in subsequent distribution.

The message processing unit 103 performs predetermined processing based on a message transmitted from the acquiring unit 104, which will be described later. In the remote control system, for example, the message processing unit 103 changes the state of the client device 10 based on the control command included in the message.

The acquiring unit 104 transfers a message received from the connection unit 107a or the connection unit 107b to the message processing unit 103. The acquiring unit 104 receives the identification information on the connection unit 107a or the connection unit 107b serving as a receiver from the connection managing unit 105, thereby switching receivers in subsequent acquisition.

The connection managing unit 105 establishes and terminates a connection by the connection units 107a and 107b. When receiving a shift instruction from the instructing unit 300a, which will be described later, the connection managing unit 105 performs shift processing on the connection units 107a and 107b used by the distributing unit 102 and the acquiring unit 104. The shift processing will be described later in detail.

The device managing unit 106 stores the identification information on another client device 10 serving as a communication partner that performs interactive communications with the client device 10 in the RAM 1002 and/or the storage 1005.

The communication program according to the first embodiment is stored in a computer connected to the network 40, such as the Internet, and provided by being downloaded via the network 40. The communication program according to the first embodiment may be provided or distributed via the network 40, such as the Internet.

Alternatively, the communication program according to the first embodiment may be recorded and provided in a computer-readable recording medium, such as a compact disc (CD) and a digital versatile disc (DVD), as an installable or executable file. Still alternatively, the communication program may be stored and provided in the ROM 1001.

The communication program according to the first embodiment has a module configuration including the units described above (the message generating unit 101, the distributing unit 102, the message processing unit 103, the acquiring unit 104, the connection managing unit 105, the device managing unit 106, and the communication unit 107). In actual hardware, the CPU 1000 reads and executes the communication program from the storage 1005 to load the units on a main memory (e.g., the RAM 1002). The units thus are generated on the main memory.

The relay server 20 according to the first embodiment includes a CPU, a ROM, a RAM, a storage, and a communication I/F. Because the relay server 20 has a configuration equivalent to that of a typical computer, detailed explanation of the hardware configuration thereof will be omitted. The relay server 20 according to the first embodiment functions as a WebSocket server. When receiving a request to establish a WebSocket connection from the client device 10, the relay server 20 establishes a connection with the client device 10 according to the procedure defined by RFC6455.

The relay server 20 stores therein a corresponding relation between the pieces of identification information on the client devices 10 serving as a pair that performs interactive communications. The relay server 20 uses the corresponding relation to transfer a message transmitted from one client device 10 to another client device 10 that makes a pair with the one client device 10. As described above, the relay server 20 functions as a relay for interactive communications performed between a plurality of client devices 10.

The instructing unit 300a according to the first embodiment, for example, periodically transmits a request to acquire the present total number of WebSocket connections to the relay servers 20 respectively. In response to the acquisition request, the relay servers 20 acquire the number of WebSocket connections connected to the respective relay servers 20 and transmit the result to the instructing unit 300a. Based on the information on the number of connections acquired from the relay servers 20, the instructing unit 300a determines whether to execute scale-out or scale-in of the relay servers 20.

The instructing unit 300a, for example, calculates the upper-limit number of connectable WebSocket connections from the value in performance of the relay servers 20. The instructing unit 300a then calculates the ratio of the present number of connections to the upper-limit number to compare the calculated ratio with a threshold. If the ratio exceeds the threshold in all the relay servers 20, the instructing unit 300a determines to execute scale-out (addition of an instance of a new relay server 20). By contrast, if the ratio falls below the threshold in a specific relay server 20, the instructing unit 300a determines to execute scale-in (discard of an instance of the relay server 20).

If the instructing unit 300a determines to execute scale-in, the instructing unit 300a issues, to the relay server 20 the instance of which is to be discarded, a shift instruction to shift connections of the client devices 10 connected thereto to another relay server 20. The shift instruction includes identification information for identifying the destination relay server 20 to which the connections are to be shifted. The relay server 20 that receives the shift instruction transmits the shift instruction to the client devices 10 connected to the relay server 20. The shift instruction is received by the client devices 10 and transferred to the respective connection managing units 105. When receiving the shift instruction, the connection managing units 105 in the respective client devices 10 start the shift processing, which will be described later.

Connection and Termination Processing According to the First Embodiment

The following describes processing performed to establish a connection and terminate the connection between the client devices 10 in the communication system according to the first embodiment. Specifically, the following describes connection establishment processing and message transmission processing performed by the client devices 10a and 10b according to the first embodiment with reference to FIGS. 7A and 7B.

Figure 7A:
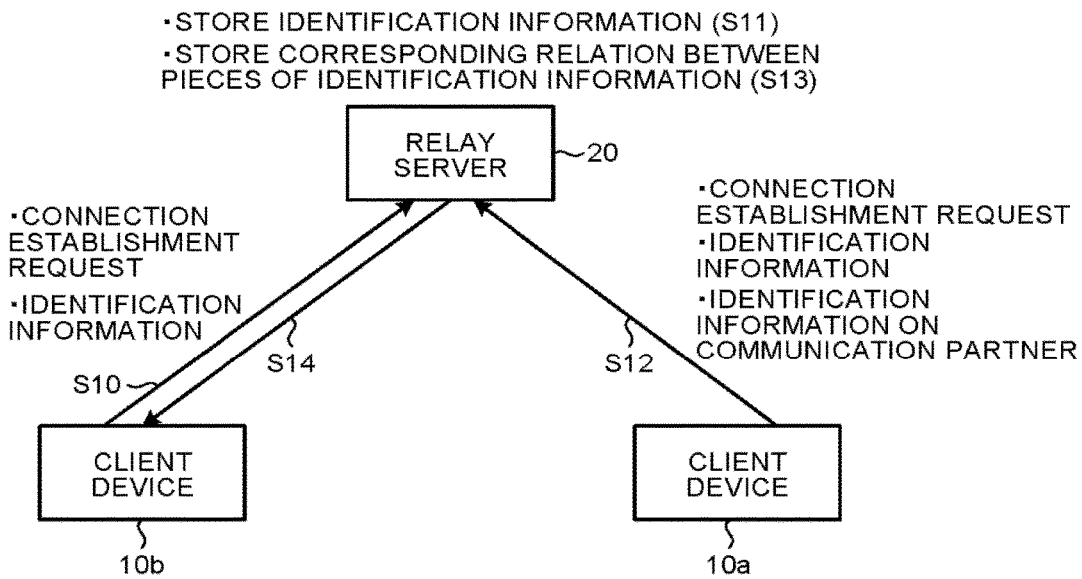
FIGS. 7A and 7B are diagrams for explaining connection establishment processing and message transmission processing performed by the client devices according to the first embodiment.

In FIG. 7A, the client device 10b serving as a home device, for example, first establishes a WebSocket connection with the relay server 20, and the client device 10a serving as an information processor and a communication partner of the client device 10b then establishes the WebSocket connection with the relay server 20.

The connection managing unit 105 of the client device 10b starts connection establishment processing for a connection with the relay server 20 in response to a predetermined event, such as a user operation and a power-on operation performed on the client device 10b. Specifically, the connection managing unit 105 of the client device 10b transmits, to the relay server 20, a connection establishment request including client identification information (referred to as "B") for identifying the client device 10b and forms the connection unit 107a in the communication unit 107 (Step S10).

The relay server 20 stores the client identification information "B" transmitted from the client device 10b in a storage area of the relay server 20 or an external database (Step S11). In response to the connection establishment request, the relay server 20 performs connection establishment processing for a connection of the client device 10b with the relay server 20.

Subsequently, the connection managing unit 105 of the client device 10a transmits, to the relay server 20, a connection establishment request including client identification information (referred to as "A") on the client device 10a and the client identification information "B" on the client device 10b with which the client device 10a desires to perform communications and forms the connection unit 107a in the communication unit 107 (Step S12). The client device 10a is informed of the client identification information "B" on the client device 10b serving as a communication partner in advance.

The relay server 20 stores therein a corresponding relation (referred to as a corresponding relation "A-B") between the client identification information "A" included in the connection establishment request transmitted from the client device 10a and the client identification information "B" transmitted from the client device 10b (Step S13). In response to the connection establishment request, the relay server 20 performs connection establishment processing for a connection of the client device 10a with the relay server 20. This processing enables the client device 10a and the client device 10b to perform interactive communications via the relay server 20.

The relay server 20 notifies the client device 10b serving as a communication partner of the client device 10a that a new connection is established with the client device 10a (Step S14). This notification is referred to as a new connection notification. The new connection notification includes the client identification information "A" on the client device 10a with which the connection is established. The client device 10b receives the new connection notification via the connection unit 107a and transfers it to the device managing unit 106. Based on the client identification information "A" included in the received new connection notification, the device managing unit 106 creates a list of the identification information (device list).

Figure 8A:
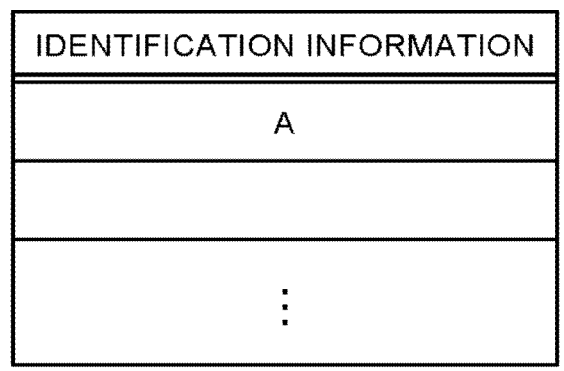
FIGS. 8A to 8C are diagrams of examples of a device list according to the first embodiment.

FIG. 8A illustrates an example of the device list created based on the client identification information "A" received at Step S12 according to the first embodiment. In the example illustrated in FIG. 8A, the device list stores therein the client identification information "A". The device managing unit 106 stores the created device list in the RAM 1002 and/or the storage 1005. When receiving a new connection notification, the device managing unit 106 adds the client identification information included in the received new connection notification to the list. Similarly to this, the client device 10a adds the client identification information "B" on the client device 10b serving as a communication partner to the device list of its own device managing unit 106 when the connection establishment is completed.

Figure 7B:
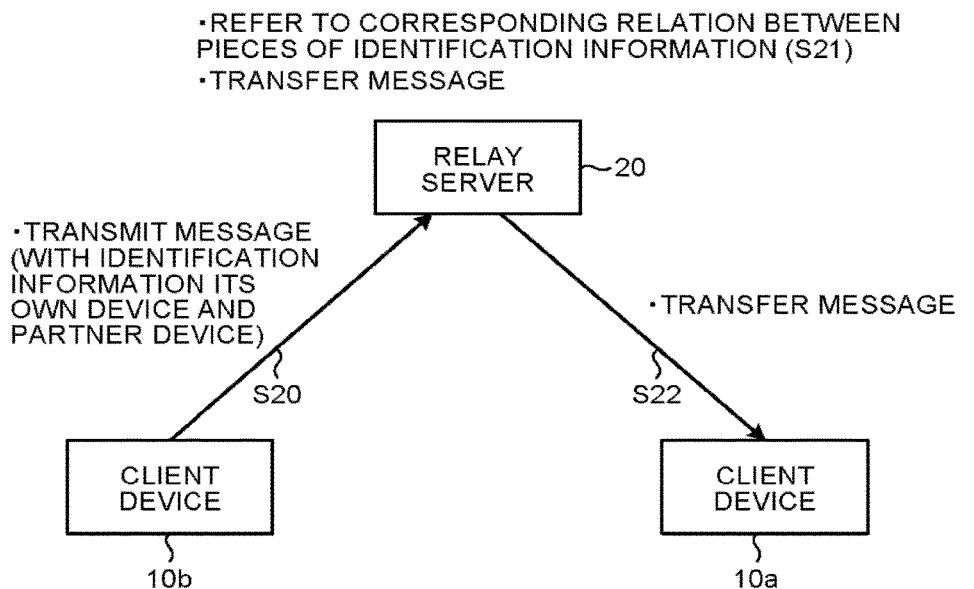

FIG. 7B illustrates an example of processing performed when the client device 10b outputs a message. The client device 10b transmits a message including the client identification information "B" on the client device 10b serving as a source and the client identification information "A" of the client device 10a serving as a destination to the relay server 20 (Step S20).

The relay server 20 interprets the message to extract the pieces of client identification information "A" and "B" from the message. The relay server 20 refers to the corresponding relation "A-B" stored in the connection establishment processing (Step S21) to determine whether the pieces of client identification information "A" and "B" are a pair that performs interactive communications. If the relay server 20 determines that the pieces of client identification information "A" and "B" are a pair, the relay server 20 transfers the message to the client device 10a (Step S22).

By contrast, if the relay server 20 determines that the pieces of client identification information "A" and "B" are not a pair, the relay server 20 transmits an error message to the client device 10b, for example.

As described above, the relay server 20 manages the corresponding relation between the pieces of identification information on the client devices 10 that perform interactive communications. Let us assume a case where the corresponding relation "A-B" is stored in the relay server 20, and another client device 10 having client identification information "C" issues a connection establishment request to the relay server 20. The connection establishment request indicates that the client identification information on a communication partner is "A". In this case, the relay server 20 stores therein two corresponding relations "A-B" and "A-C".

Figure 8B:
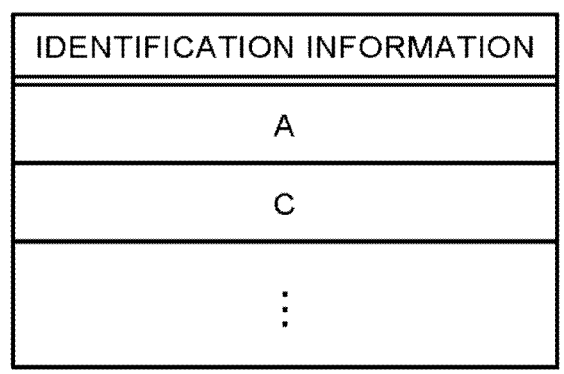

The client device 10b also receives the new connection notification on the client device 10 having the client identification information "C" and adds the client identification information "C" to the device list. FIG. 8B illustrates an example of the device list obtained by adding the client identification information "C" to the device list illustrated in FIG. 8A.

Figure 9:
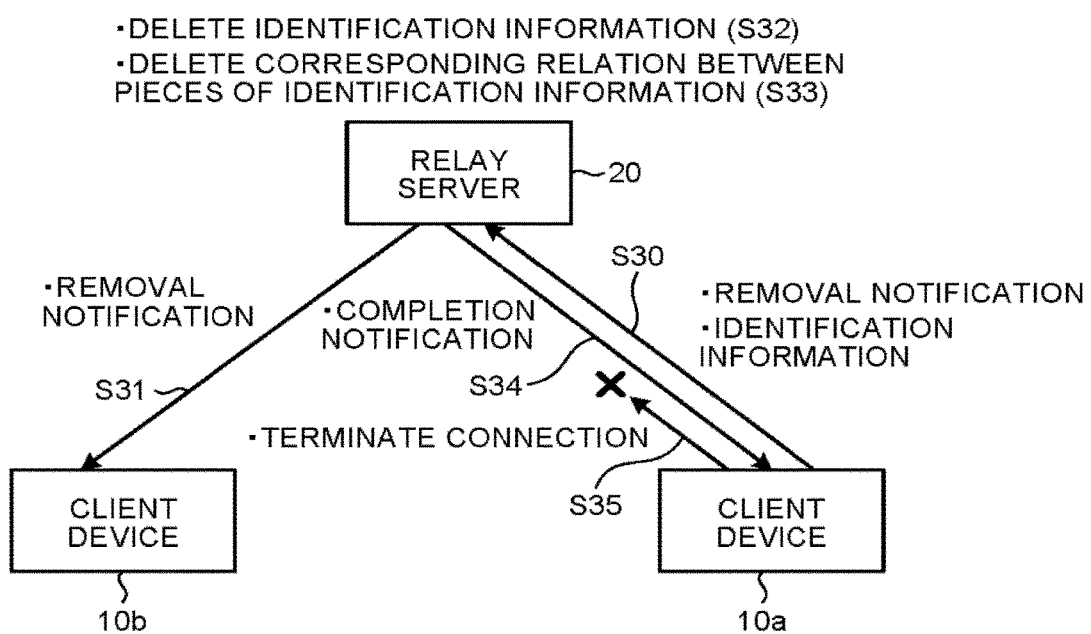
FIG. 9 is a diagram for explaining connection termination processing performed by the client devices according to the first embodiment.

The following describes connection termination processing performed by the client devices 10a and 10b according to the first embodiment with reference to FIG. 9. In this example, the client devices 10a and 10b and the client device 10 having the client identification information "C" are connected to the relay server 20. The relay server 20 stores therein two corresponding relations "A-B" and "B-C".

The connection managing unit 105 of the client device 10a transmits a connection termination notification including the client identification information "A" to the relay server 20 in response to a predetermined event, such as a user operation (Step S30). In response to the connection termination notification, the relay server 20 refers to the stored corresponding relations between the pieces of client identification information to search for the client identification information (client identification information "B" in this example) having a corresponding relation with the client identification information "A". As a result of the search, the relay server 20 acquires the corresponding relations "A-B" and "B-C".

Figure 8C:
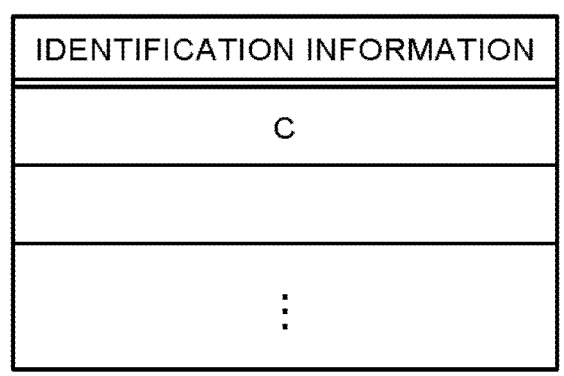

Based on the acquired corresponding relation "A-B", the relay server 20 notifies the client device 10b that a connection termination notification is transmitted from the client device 10a. This notification is referred to as a removal notification (Step S31). The removal notification includes the client identification information "A" on the client device 10a serving as the transmitter of the connection termination notification. The client device 10b transfers the received removal notification via the connection unit 107a to the device managing unit 106. Based on the removal notification, the device managing unit 106 deletes the client identification information "A" from the device list (Step S32). FIG. 8C illustrates an example of the device list obtained by deleting the client identification information "A" from the device list illustrated in FIG. 8B.

Subsequently, the relay server 20 deletes the client identification information "A" and the corresponding relation "B-C" including the client identification information "A" stored in the relay server 20 (Step S33). The relay server 20 notifies the client device 10a of completion of the processing (Step S34). In response to the processing completion notification, the client device 10a cuts the WebSocket connection with the relay server 20 (Step S35) and deletes the client identification information "B" on the client device 10b serving as a communication partner from the device list in its own device managing unit 106. The series of termination processing is thus ended.

While the removal notification is transmitted from the client device 10 in this example, the embodiment is not limited thereto. When the relay server 20 detects forced disconnection in one client device 10 or disconnection because of unexpected reason, for example, the relay server 20 may transmit a removal notification to another client device 10 having a corresponding relation with the first client device 10. The removal notification may have a structure of a will in the message queueing telemetry transport (MQTT), for example.

With the processing performed by the client device 10 to establish and terminate a connection described above, the client device 10 dynamically stores therein the client identification information on another client device 10 currently being a communication partner of the client device 10.

Processing for Shifting the Relay Servers According to the First Embodiment

Figure 10A:
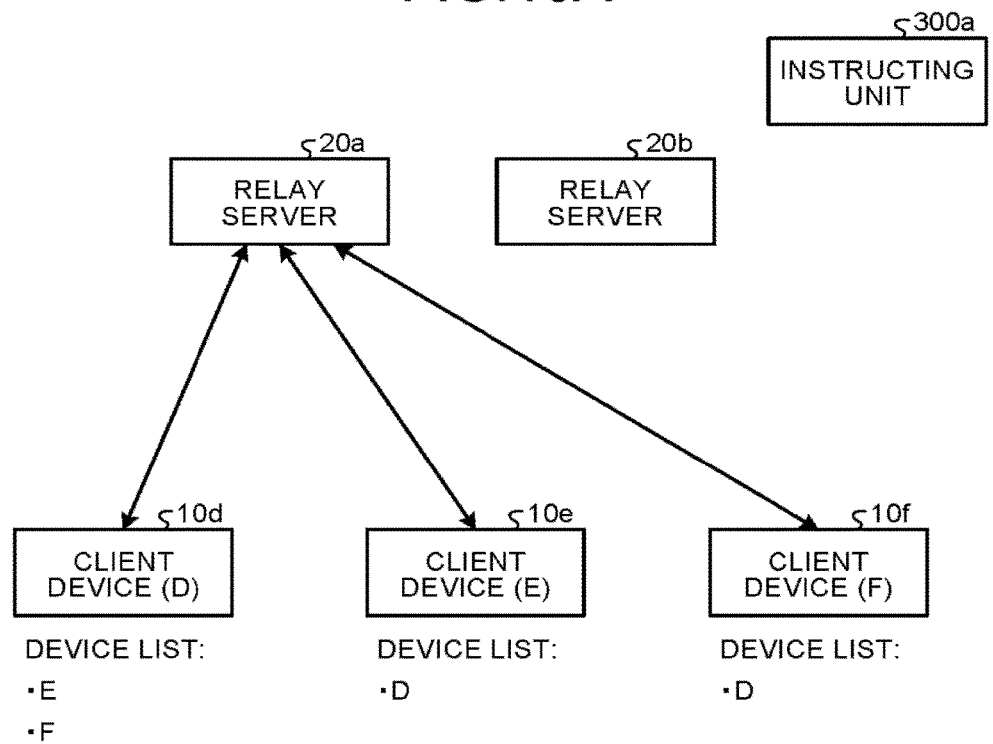
FIGS. 10A and 10B are diagrams schematically illustrating processing for shifting relay servers according to the first embodiment.
Figure 10B:
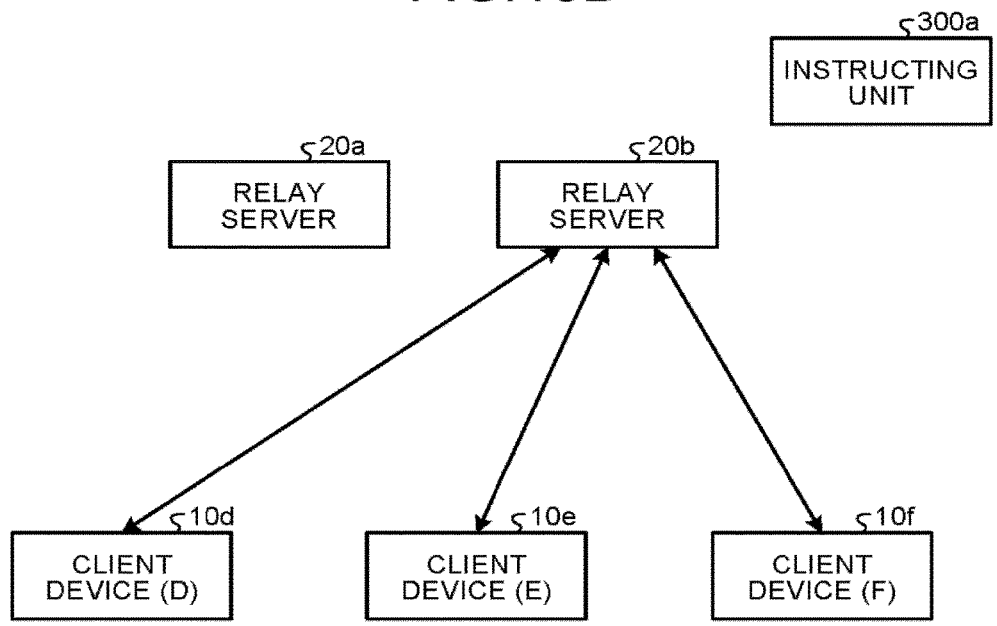

The following describes processing for shifting the relay servers 20 according to the first embodiment. FIGS. 10A and 10B schematically illustrate the processing for shifting the relay servers 20 according to the first embodiment. As illustrated in FIG. 10A, the communication system includes two relay servers 20a and 20b, three client devices 10d, 10e, and 10f having pieces of client identification information "D", "E", and "F", respectively, and the instructing unit 300a. The client devices 10d, 10e, and 10f establish WebSocket connections with the relay server 20a.

The client device 10d serves as a communication partner of the client devices 10e and 10f. The client device 10d stores the pieces of client identification information "E" and "F" in the device list. The client devices 10e and 10f store the client identification information "D" in the device list. The relay server 20a stores therein corresponding relations "D-E" and "D-F".

Let us assume a case where the instructing unit 300a issues, to the client devices 10d to 10f, a shift instruction to shift the connections of the client devices 10d to 10f from the relay server 20a to the relay server 20b. FIG. 10B illustrates a state where the connections of the client devices 10d to 10f are shifted to the relay server 20b in response to the shift instruction. The shift instruction includes identification information on the relay server 20b serving as a destination. The identification information on the relay server 20b serving as a destination may be an Internet Protocol (IP) address of the relay server 20b on the network 40, for example.

FIG. 11 is an exemplary sequence diagram of a process performed by the client device in the processing for shifting the relay servers according to the first embodiment. In FIG. 11, components common to those in FIGS. 5, 6, and 10 are denoted by same reference numerals, and detailed explanation thereof will be omitted. The process illustrated in FIG. 11 is common to the client devices 10d, 10e, and 10f. In the following description, the client device 10d represents the client devices 10d, 10e, and 10f if not otherwise specified.

Before the start of the process in the sequence diagram illustrated in FIG. 11, the client device 10d creates the connection unit 107a in the communication unit 107, and the connection unit 107a establishes a connection between the client device 10d and the relay server 20a. At this time, establishment of a connection between the client device 10d and the relay server 20b is not started yet, and the connection unit 107b is not created yet.

In FIG. 11, the instructing unit 300a transmits a shift instruction including the identification information on the relay server 20b serving as a destination to the client devices 10d, 10e, and 10f connected to the relay server 20a (Step S100). If the client device 10d receives the shift instruction transmitted from the instructing unit 300a, the client device 10d transfers the received shift instruction to the connection managing unit 105.

In response to the received shift instruction, the connection managing unit 105 issues a connection establishment request to the relay server 20b specified by the shift instruction and starts processing for establishing a WebSocket connection with the relay server 20b according to the procedure defined by RFC6455 (Step S101). As a result, the connection unit 107b is newly created in the communication unit 107. The connection unit 107b performs processing for establishing the WebSocket connection with the relay server 20b. If the connection unit 107b succeeds in establishing a connection with the relay server 20b, the connection unit 107b notifies the connection managing unit 105 of the success (Step S102).

If the connection managing unit 105 receives the success notification from the connection unit 107b, the connection managing unit 105 transmits an establishment completion notification indicating completion of establishment of a connection with the relay server 20b serving as a destination to the connection unit 107a that maintains the connection with the relay server 20a serving as an origin (Step S103). The connection unit 107a transmits, to the relay server 20a, the establishment completion notification including the client identification information "D" on the client device 10d serving as a source. If the connection unit 107a succeeds in transmitting the establishment completion notification, the connection unit 107a notifies the connection managing unit 105 of the success (Step S104).

If the relay server 20a receives the establishment completion notification transmitted from the connection unit 107a of the client device 10d based on the processing at Step S104, the relay server 20a refers to the stored corresponding relations to transfer the establishment completion notification to the client devices 10e and 10f having corresponding relations with the client device 10d. The processing of transferring the establishment completion notification corresponds to the processing of transferring the new connection notification described at Step S14 in FIG. 7A.

The connection managing unit 105 transmits a device list acquisition request to the device managing unit 106 (Step S105). In response to the device list acquisition request, the device managing unit 106 acquires a device list (Step S106). Based on the acquired device list, the device managing unit 106 acquires the client identification information on the client device currently being in communication with the client device 10d. At Step S107, the connection managing unit 105 waits until it receives establishment completion notifications corresponding to all the pieces of client identification information included in the acquired device list.

Similarly to the client device 10d, the client devices 10e and 10f being in communication with the relay server 20a also receive the shift instruction from the instructing unit 300a. The client devices 10e and 10f also perform the processing from Step S101 to Step S104 in response to the shift instruction, thereby transmitting an establishment completion notification to the client device 10d from the respective connection units 107a via the relay server 20a. The connection managing unit 105 of the client device 10d waits until it receives the establishment completion notifications corresponding to the pieces of client identification information "E" and "F" stored in the device list acquired at Step S106.

If the connection managing unit 105 determines that it receives the establishment completion notifications corresponding to all the pieces of client identification information included in the acquired device list at Step S107, the process is shifted to Step S108. At Step S108, the connection managing unit 105 issues, to the distributing unit 102, a switching instruction to switch connection units so as to transmit a message subsequently received from the message generating unit 101 using the connection unit 107b newly created at Step S101. In response to the switching instruction, the distributing unit 102 performs predetermined processing (e.g., setting of destination information added to the message) to transmit the message to the relay server 20b, for example. If the processing is completed, the distributing unit 102 notifies the connection managing unit 105 of completion of the switching (Step S109).

If the connection managing unit 105 receives the switching completion notification from the distributing unit 102, the connection managing unit 105 transmits a transmission termination notification (FIN) to the relay server 20a using the connection unit 107a (Step S110). The transmission termination notification notifies the relay server 20a that no more message is to be transmitted from the client device 10d via the connection unit 107a. The connection managing unit 105 transmits the transmission termination notification including the client identification information "D" indicating the client device 10d serving as a source. If the connection unit 107a succeeds in transmitting the connection termination notification to the relay server 20a, the connection unit 107a notifies the connection managing unit 105 of the success (Step S111).

If the relay server 20a receives the transmission termination notification from the client device 10d, the relay server 20a transfers the received transmission termination notification to the client devices 10e and 10f having corresponding relations with the client device 10d in the same manner as that of the establishment completion notification. Similarly to the processing of transferring the establishment completion notification, the processing of transferring the transmission termination notification also corresponds to the processing of transferring the new connection notification performed at Step S14 in FIG. 7A.

If the connection managing unit 105 receives the success notification from the connection unit 107a, the connection managing unit 105 waits for transmission termination notifications transmitted from the client devices 10e and 10f (Step S112).

By receiving the transmission termination notifications from both of the client devices 10e and 10f, the connection managing unit 105 can determine that no more message is to be transmitted from any partner to itself, that is, to the client device 10d via the connection unit 107a. If the connection managing unit 105 receives the transmission termination notifications from both of the client devices 10e and 10f, the connection managing unit 105 transmits a connection termination request to the connection unit 107a according to the procedure defined by RFC6455 (Step S113). In response to this, the connection unit 107a cuts the connection with the relay server 20a.

If the connection unit 107a succeeds in cutting the connection, the connection unit 107a notifies the connection managing unit 105 of the success (Step S114). If the connection managing unit 105 receives the notification indicating the success in cutting the connection from the connection unit 107a, the connection managing unit 105 notifies the instructing unit 300a of completion of the shift performed in response to the shift instruction received at Step S100 (Step S115).

With the process described above, the client devices 10d, 10e, and 10f according to the first embodiment can shift the connections from the relay server 20a to which they are connected to the relay server 20b as follows: the client devices 10d, 10e, and 10f switch the transmission destination of a message to the relay server 20b at a timing when they determine that connections are established between the relay server 20b serving as a destination and the respective connection units 107b and that the client devices 10d, 10e, and 10f can perform interactive communications with the relay server 20b. This mechanism can prevent instantaneous interruption in transmission of the message when the connections are shifted from the relay server 20a to the relay server 20b.

Furthermore, the client devices 10d, 10e, and 10f according to the first embodiment terminates the connections via the connection units 107a at a timing when they determine that no more message is to be transmitted to or received from the relay server 20a serving as an origin via the respective connection units 107a. This mechanism enables prompt release of resource consumption.

First Modification of the First Embodiment

Figure 12:
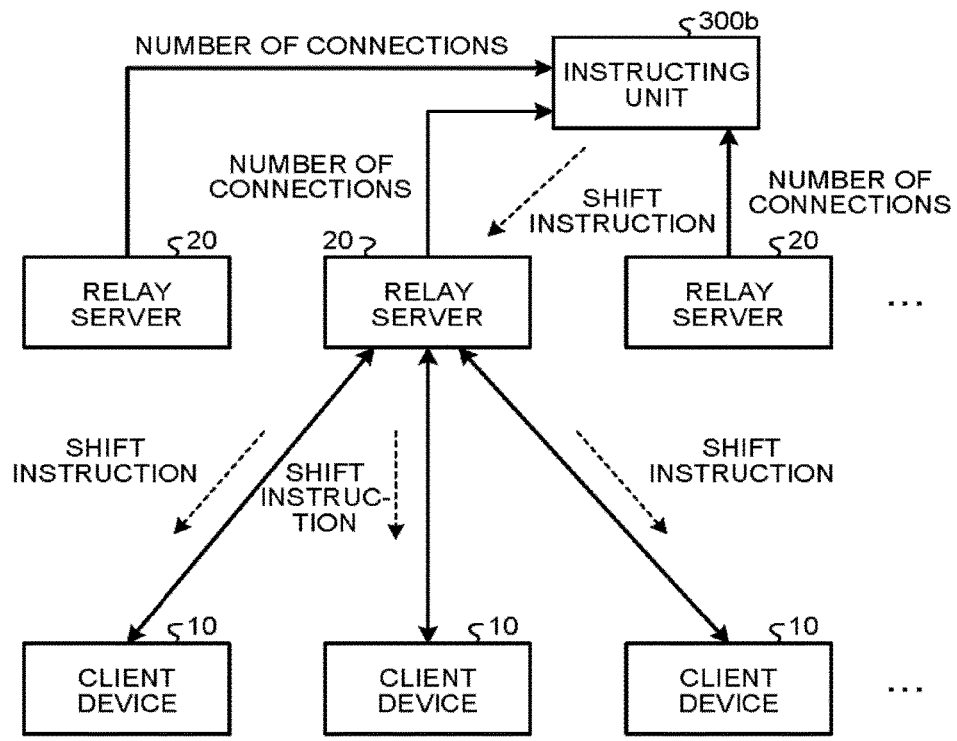
FIG. 12 is a block diagram of an exemplary configuration of a communication system according to a first modification of the first embodiment.

The following describes a first modification of the first embodiment. While the instructing unit 300a according to the first embodiment directly transmits the shift instruction to the client devices 10, the embodiment is not limited thereto. FIG. 12 illustrates an exemplary configuration of a communication system according to the first modification of the first embodiment. As illustrated in FIG. 12, an instructing unit 300b according to the first modification of the first embodiment transmits a shift instruction to the client devices 10 via the relay server 20 to which the client devices 10 are connected.

In the example illustrated in FIG. 12, the instructing unit 300b acquires the number of WebSocket connections from the relay servers 20. Based on the information on the number of WebSocket connections acquired from the relay servers 20, the instructing unit 300b determines whether to shift the connection destination of all the client devices 10 connected to a certain relay server 20 to another relay server 20, for example.

The instructing unit 300b, for example, shifts the connections of all the client devices 10 connected to the relay server 20 having the number of WebSocket connections exceeding a threshold out of the relay servers 20 to another relay server 20. The relay server 20 serving as a destination may be determined by selecting the relay server 20 having the smallest number of WebSocket connections out of the numbers of WebSocket connections in order, for example.

The instructing unit 300b transmits a shift instruction including the identification information (e.g., the IP address) on the relay server 20 serving as a destination to the relay server 20 serving as an origin. When receiving the shift instruction, the relay server 20 serving as an origin duplicates and transmits the shift instruction to all the client devices 10 connected to the relay server 20 serving as an origin. Subsequent processing is the same as the processing from Step S101 in FIG. 11.

Second Modification of the First Embodiment

Figure 13:
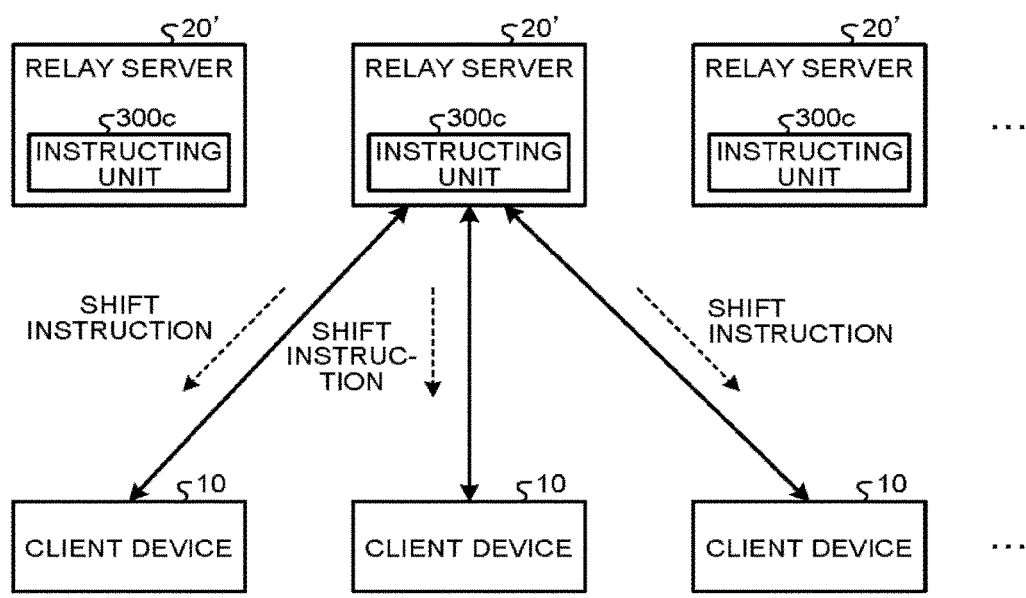
FIG. 13 is a block diagram of an exemplary configuration of a communication system according to a second modification of the first embodiment.

The following describes a second modification of the first embodiment. FIG. 13 illustrates an exemplary configuration of a communication system according to the second modification of the first embodiment. While the instructing unit 300a according to the first embodiment is independent hardware, such as the mediation server 30, instructing units 300c according to the second modification of the first embodiment are provided in respective relay servers 20' as illustrated in FIG. 13.

In this case, the instructing unit 300c monitors various states of the relay server 20' to which the instructing unit 300c belongs (e.g., the number of WebSocket connections, the CPU usage rate, the memory usage, and the operating state of other devices). The instructing units 300c of the respective relay servers 20' may perform communications with one another to monitor the relay servers 20' besides the relay server 20 to which each instructing unit 300c belongs. With this configuration, the instructing unit 300c can issue a shift instruction when determining that a failure occurs in the relay server 20' to which the instructing unit 300c belongs, for example.

Third Modification of the First Embodiment

Figure 14:
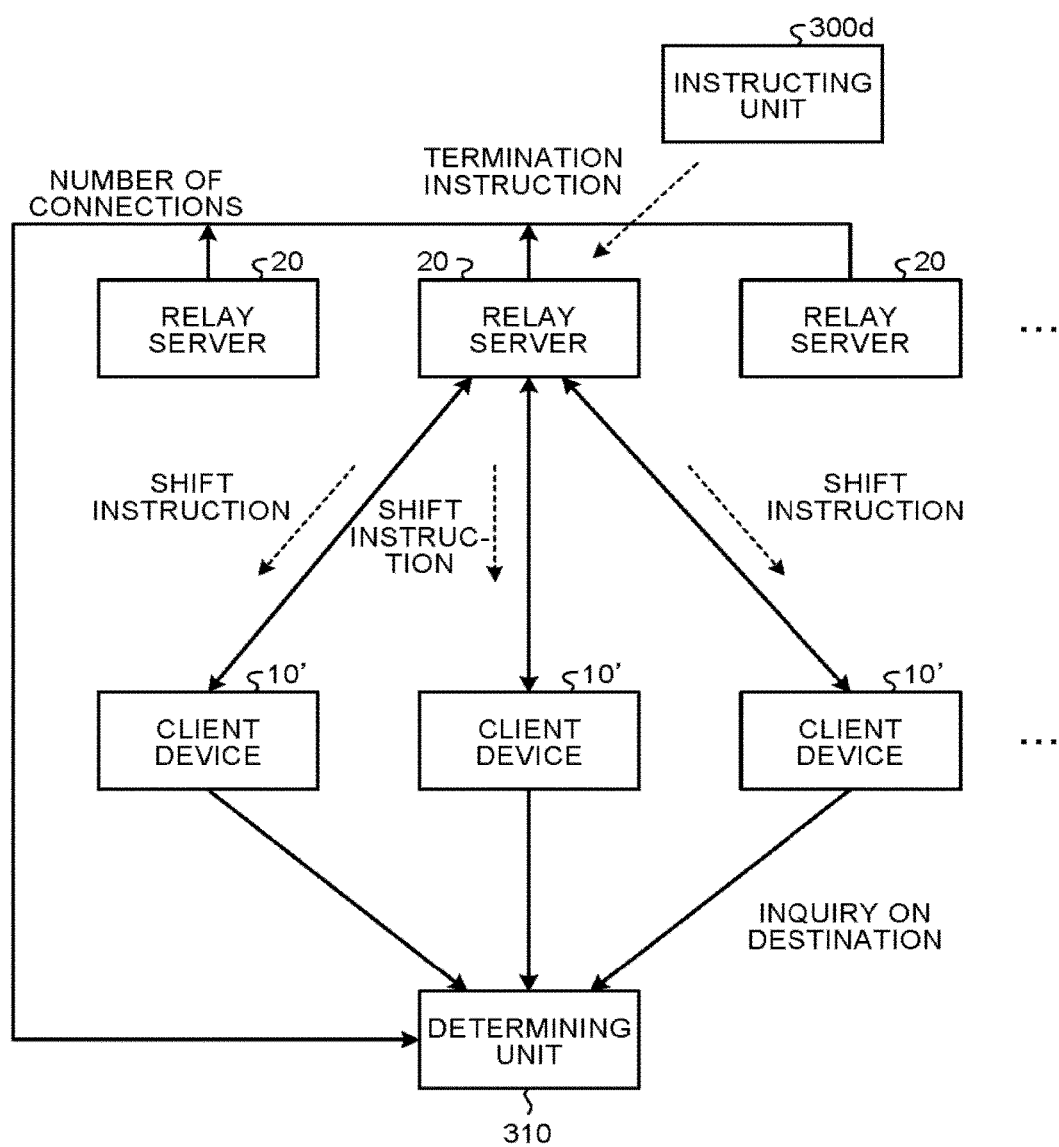
FIG. 14 is a block diagram of an exemplary configuration of a communication system according to a third modification of the first embodiment.

The following describes a third modification of the first embodiment. FIG. 14 illustrates an exemplary configuration of a communication system according to the third modification of the first embodiment. The communication system illustrated in FIG. 14 is obtained by adding a determining unit 310 to the configuration of the communication system illustrated in FIG. 1. An instructing unit 300d issues a termination instruction to a specific relay server 20. Furthermore, client devices 10' have a slightly different configuration to make an inquiry on a shift destination, which will be described later.

While the shift instruction according to the first embodiment includes the identification information on the relay server 20 serving as a destination, the embodiment is not limited thereto. The instructing unit 300d according to the third modification of the first embodiment issues a termination instruction to a specific relay server 20 but issues no instruction indicating the relay server 20 to which the client devices 10' connected to the specific relay server 20 supplied with the termination instruction are to be shifted. The relay server 20 that receives the termination instruction transmits the shift instruction including no identification information on the relay server 20 serving as a destination to the client devices 10'.

When receiving the shift instruction from the relay server 20, the client devices 10' inquires of the determining unit 310 to which relay server 20 the client devices 10' are to be shifted. Similarly to the instructing unit 300b according to the first modification of the first embodiment, the determining unit 310 acquires the number of WebSocket connections from the relay servers 20. Based on the information on the number of WebSocket connections acquired from the relay servers 20, the determining unit 310 determines the relay server 20 serving as a destination. The determining unit 310 outputs the identification information on the relay server 20 determined to be the destination as a response to the inquiry from the client devices 10'. The client devices 10' perform the processing from Step S101 in FIG. 11 on the relay server 20 specified in the response, thereby performing the processing for shifting the relay servers 20.

Fourth Modification of the First Embodiment

The following describes a fourth modification of the first embodiment. While the client devices 10 according to the first embodiment transmit the new connection notification and the removal notification to one another, thereby updating the device lists in the respective connection managing units 105 to the latest state, the embodiment is not limited thereto. The client devices 10 may transmit no new connection notification or no removal notification. Instead of transmitting the notifications, the client devices 10 may store therein a history of the client identification information on the client device 10 serving as a transmitter of a message previously transmitted to the respective client devices 10 and create the device list based on the history.

In this case, in transmission of a message at Step S22 in FIG. 7B, for example, the relay server 20 adds the client identification information on the client device 10b serving as a transmitter to the message transferred to the client device 10a. When receiving the message, the acquiring unit 104 of the client device 10a transfers the client identification information on the transmitter added to the message to the device managing unit 106. The device managing unit 106 stores the client identification information transferred from the acquiring unit 104 in the storage 1005, for example, in an accumulative manner. With this mechanism, the device managing unit 106 of the client device 10a can manage the client identification information on the client device 10b that has transmitted a message to the client device 10a.

Fifth Modification of the First Embodiment

The following describes a fifth modification of the first embodiment. While the transmission termination notification transmitted at Step S110 in FIG. 11 according to the first embodiment includes the client identification information on the client device 10 serving as a transmitter, the embodiment is not limited thereto. The transmission termination notification according to the fifth modification of the first embodiment includes no client identification information on the client device 10 serving as a transmitter. In this case, the connection managing unit 105 waits until it receives transmission termination notifications of the number of client devices 10 included in the device list.

As illustrated in FIGS. 10A and 10B, for example, let us assume a case where the connection destination of the client devices 10*d*, 10*e*, and 10*f* is shifted from the relay server 20*a* (refer to FIG. 10A) to the relay server 20*b* (refer to FIG. 10B). In this case, the connection managing unit 105 of the client device 10*d*, for example, waits until it receives two transmission termination notifications.

As described above, to switch the connection of the client device 10 from the relay server 20 serving as an origin to the relay server 20 serving as a destination, the client device 10 according to the first embodiment and the modifications thereof establishes a connection with the relay server 20 serving as a destination before cutting the connection with the relay server 20 serving as an origin. This mechanism can prevent the client device 10 from being momentarily incapable of performing communications in association with the switching of the connection.

The client devices 10 according to the first embodiment and the modifications thereof transmit, to one another, an establishment completion notification indicating completion of the connection with the relay server 20 serving as a destination. The client devices 10 switch the relay servers 20 to which they transmit a message when all the client devices 10 connected to the same relay server 20 complete establishment of the connection. This mechanism can prevent instantaneous interruption in transmission of the message due to difference between the client devices 10 in the timing when they complete establishing the connection.

The client devices 10 according to the first embodiment and the modifications thereof transmit the transmission termination notification to one another. The client devices 10 cut the old connection at a timing when the client devices 10 determine that no more message is to be transmitted to them. This mechanism can release the resource consumption at a timing when the connection becomes unnecessary, thereby promptly making the relay server 20 capable of being shut down. In a case where the instance of the relay server 20 is charged by time unit, for example, this mechanism can reduce the charge for use of the instance of the relay server 20.

The client device 10 according to the first embodiment and the modifications thereof always manages the device list of the client devices 10 that perform communications with itself. In the processing for shifting the relay servers 20, the client device 10 waits until it receives the transmission termination notification from all the client devices 10 included in the device list. Even if a plurality of pairs of client devices 10 perform interactive communications, this mechanism can appropriately control the timing to cut the connection with the relay server 20 serving as an origin.

Let us assume a case of a communication system in which the client devices 10 are mobile terminals and home devices, and the mobile terminals perform remote control on the home devices, for example. In the switching of the relay servers 20 according to the conventional technology, there is a time lag after an instruction of control is issued before completion is actually detected, thereby deteriorating usability for a user. In another example, let us assume a case of a communication system that transmits a message requiring immediacy, such as an emergency notification in a disaster. In the switching of the relay servers 20 according to the conventional technology, delay in the notification leads to delay in an initial response, resulting in occurrence of a problem. By applying the communication system according to the first embodiment and the modifications thereof to the cases described above, these problems can be solved.

Another Application Example of the First Embodiment

The following describes another application example of the first embodiment where the communication system according to the first embodiment is applied to a message broker system. The system configuration of the message broker system may be the same as that of the communication system according to the first embodiment described with reference to FIG. 1. In other words, the message broker system may have the system configuration in which the client devices 10 are connected to the relay servers 20 via a communication channel, such as the network 40, to perform interactive communications among the client devices 10.

In the message broker system, the relay servers 20 function as broker servers that relay messages. The messages transmitted and received by the message broker system each include an address referred to as a topic. After being connected to the broker server (relay server 20), the client device 10 (referred to as a publisher) that desires to transmit a message transmits the message using the topic as a destination. A client (referred to as a subscriber) who wants to receive the message connects the broker server in advance and notifies the broker server of the name of the topic to which the client wants to subscribe. If the publisher transmits a message to the topic, the broker server distributes the message to all the subscribers who subscribe to the topic.

The following describes connection establishment processing and connection termination processing performed by the client devices 10 and processing for shifting the broker servers (relay servers 20) in the message broker system.

Figure 15A:
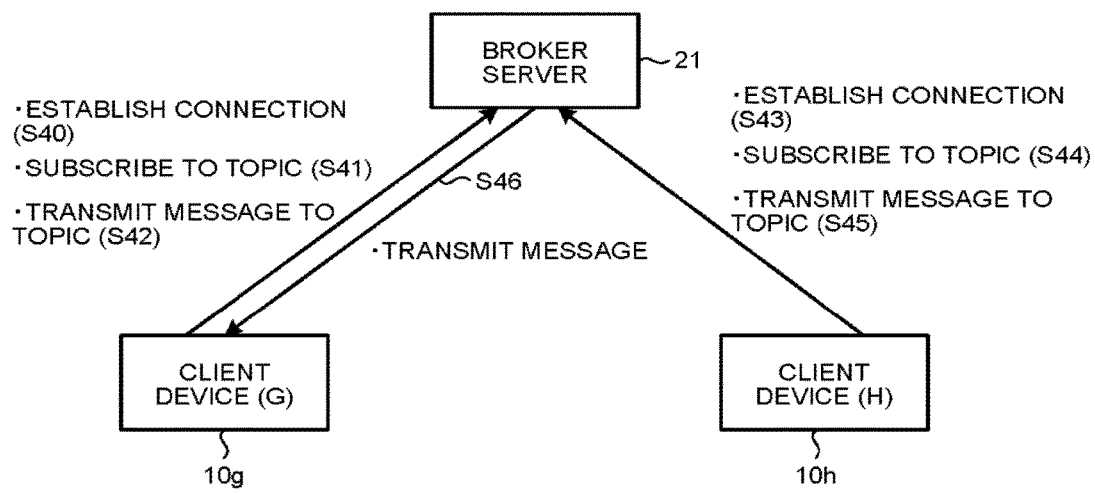
FIGS. 15A and 15B are diagrams for explaining processing performed to establish a connection and terminate a connection in a case where the communication system according to the first embodiment is applied to a message broker system.
Figure 15B:
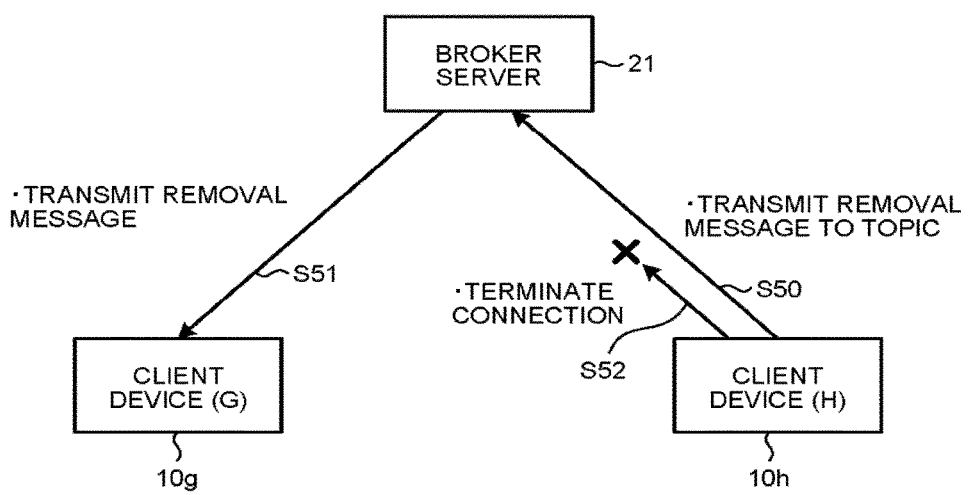

The following describes processing performed by the client devices 10 to establish a connection and terminate a connection in a case where the communication system according to the first embodiment is applied to the message broker system with reference to FIGS. 15A and 15B. In FIGS. 15A and 15B, a broker server 21 corresponds to the relay server 20, and client devices 10*g* and 10*h* correspond to the client device 10*a* serving as a computer. The pieces of client identification information on the client devices 10*g* and 10*h* are "G" and "H", respectively.

In FIG. 15A, the client device 10*g* first establishes a WebSocket connection with the broker server 21, and the client device 10*h* then establishes a WebSocket connection with the broker server 21, for example.

The client device 10*g* performs processing for establishing a connection with the broker server 21 (Step S40). If the connection is established, the client device 10*g* subscribes to a topic "group 1" for managing a group of communication partners (Step S41). The connection managing unit 105 of the client device 10*g*, for example, stores the information on the topic "group 1" to which the client device 10*g* subscribes in the RAM 1002 or the storage 1005.

The client device 10*g* transmits a message "join G" including the client identification information "G" to the topic "group 1" to which the client device 10*g* subscribes (Step S42). The message "join G" notifies other client devices (e.g., the client device 10*h*) that subscribe to the same topic "group 1" that the client device 10*g* joins in as a communication partner.

Subsequently, the client device 10*h* performs the same connection establishment processing (Step S43). If the connection with the broker server 21 is established, the client device 10h subscribes to the topic "group 1" (Step S44). The client device 10h transmits a message "join H" including the client identification information "H" to the topic "group 1" (Step S45). The message "join H" is transmitted to the client device 10g that subscribes to the topic "group 1" (Step S46).

If the client device 10g receives the message "join H", the client device 10g adds the client identification information "H" to the device list in its own connection managing unit 105, thereby updating the device list. The client devices 10g and 10h may periodically transmit the pieces of client identification information "G" and "H" in the messages "join G" and "join H", respectively, thereby keeping the respective device lists up-to-date.

FIG. 15B illustrates an example of processing performed by the client device 10h to terminate a connection. To terminate the connection, the client device 10h transmits a message "remove H" including the client identification information "H" as a message indicating removal to the same topic "group 1" as that in the establishment of the connection (Step S50). The message "remove H" is distributed to the client device 10g via the broker server 21 (Step S51).

If the client device 10g receives the message "remove H", the client device 10g deletes the client identification information "H" from the device list in the connection managing unit 105 of the client device 10g based on the client identification information "H" included in the received message "remove H". With this processing, the client device 10g can keep the device list for managing the client device that performs communications with the client device 10g up-to-date.

The process for issuing the removal notification is not limited thereto. The client device 10h, for example, may issue the removal notification using a will function defined by a message protocol, such as MQTT. In this case, after establishing a connection, the client device 10h registers a message similar to the removal notification in the broker server 21 as a will defined by MQTT. When the connection with the client device 10h is cut, the broker server 21 transmits the removal notification to the client device 10g that subscribes to the topic "group 1" based on the will.

The process for switching the broker servers 21 is different from the process from Step S101 on in the sequence diagram illustrated in FIG. 11 in the processing at Step S103 for transmitting an establishment completion notification and the processing at Step S110 for transmitting a transmission termination notification. In the present application example of the first embodiment, when the connection unit 107b of the client device 10g completes establishment of a connection with the broker server 21 serving as a destination, the client device 10g transmits, to the topic "group 1", an establishment completion notification, such as "ESTABLISH G" including the client identification information "G" on the client device 10g serving as a transmitter. Similarly to this, when transmission is terminated, the client device 10g transmits a transmission termination notification, such as "FIN G", including the client identification information "G" on the client device 10g serving as a transmitter as a notification indicating that no more message is to be transmitted from the client device 10g via the connection unit 107a to the broker server 21 serving as an origin. After the transmission termination notification is transmitted, the client device 10h terminates a WebSocket connection with the broker server 20 (Step S52).

As described above, the communication system according to the first embodiment is also applicable to the message broker system, and the message broker system can provide the same advantageous effects as those of the first embodiment. Especially when the first embodiment is applied to the message broker system, the message broker system can provide the same advantageous effects as those of the first embodiment without changing the configuration of the conventional message broker, thereby saving time and effort in development.

Still Another Application Example of the First Embodiment

The following describes still another application example of the first embodiment where the communication system according to the first embodiment is applied to a video compositing system. The system configuration of the video compositing system may be the same as that of the communication system according to the first embodiment described with reference to FIG. 1. In other words, the video compositing system may have the system configuration in which the client devices 10 are connected to the relay servers 20 via a communication channel, such as the network 40, to perform interactive communications among the client devices 10.

Figure 16:
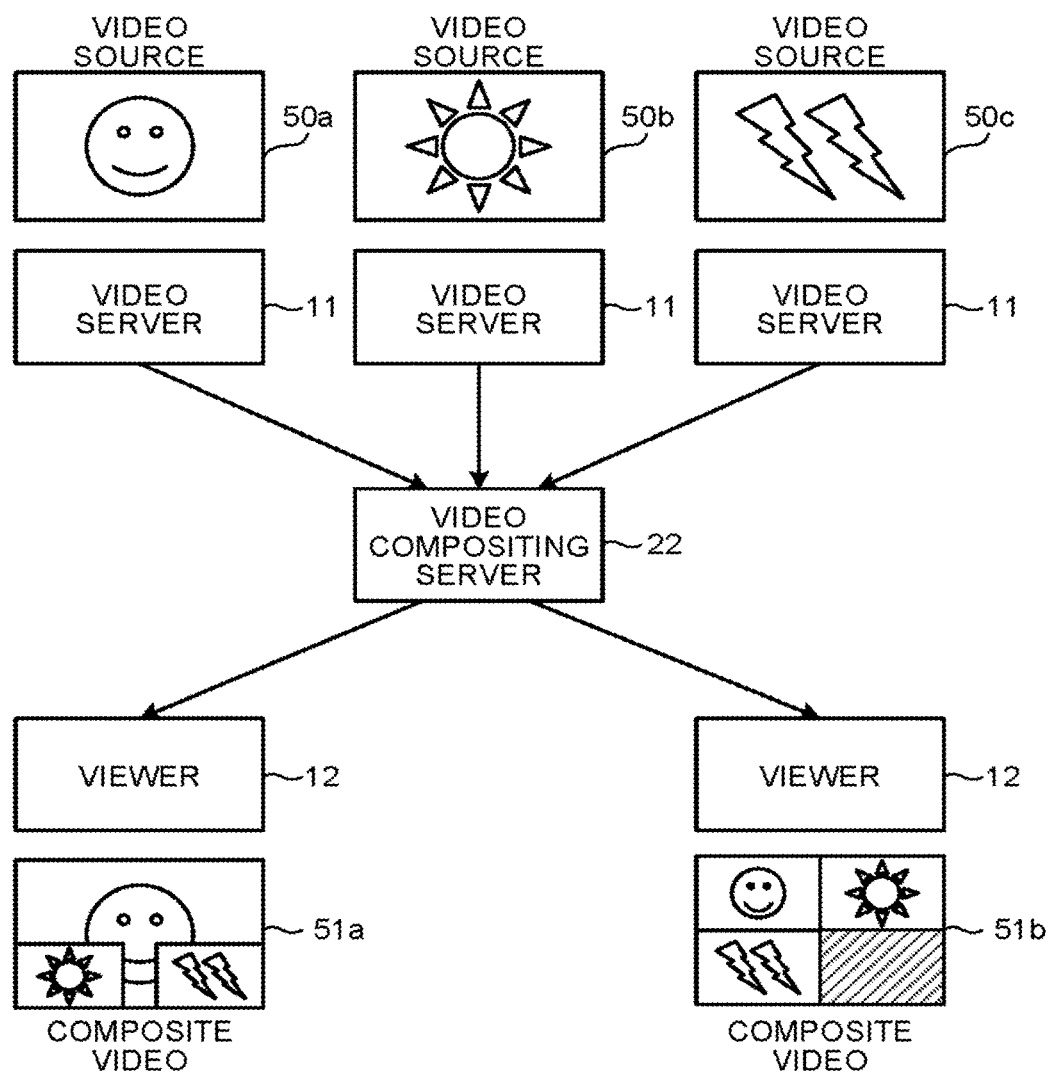
FIG. 16 is a diagram schematically illustrating a configuration of a video compositing system according to the conventional technique.

FIG. 16 schematically illustrates a configuration of a video compositing system according to the conventional technology. The video compositing system includes a plurality of video servers 11 and a video compositing server 22. The video servers 11 transmit video sources 50a, 50b, and 50c. The video compositing server 22 composites the video sources 50a, 50b, and 50c transmitted from the video servers 11 and transmits a composited video source to one or more viewers 12. The video compositing server 22 transmits composite video obtained by compositing the video sources 50a, 50b, and 50c to the viewers 12. The viewers 12 correspond to the client device 10a serving as a computer illustrated in FIG. 3, for example. The viewers 12 display the composite video transmitted from the video compositing server 22 based on an installed video display program.

The viewer 12 can specify a layout for compositing video in the video compositing server 22 in advance. The video compositing server 22 composites the video sources 50a, 50b, and 50c based on the layout specified by the viewer 12 and transmits the composite video to the viewer 12 that specifies the layout. In the example illustrated in FIG. 16, the video compositing server 22 composites the video sources 50a, 50b, and 50c based on layouts specified by the respective viewers 12 and transmits composite video 51a and 51b to the respective viewers 12 that specify the layouts.

Figure 17A:
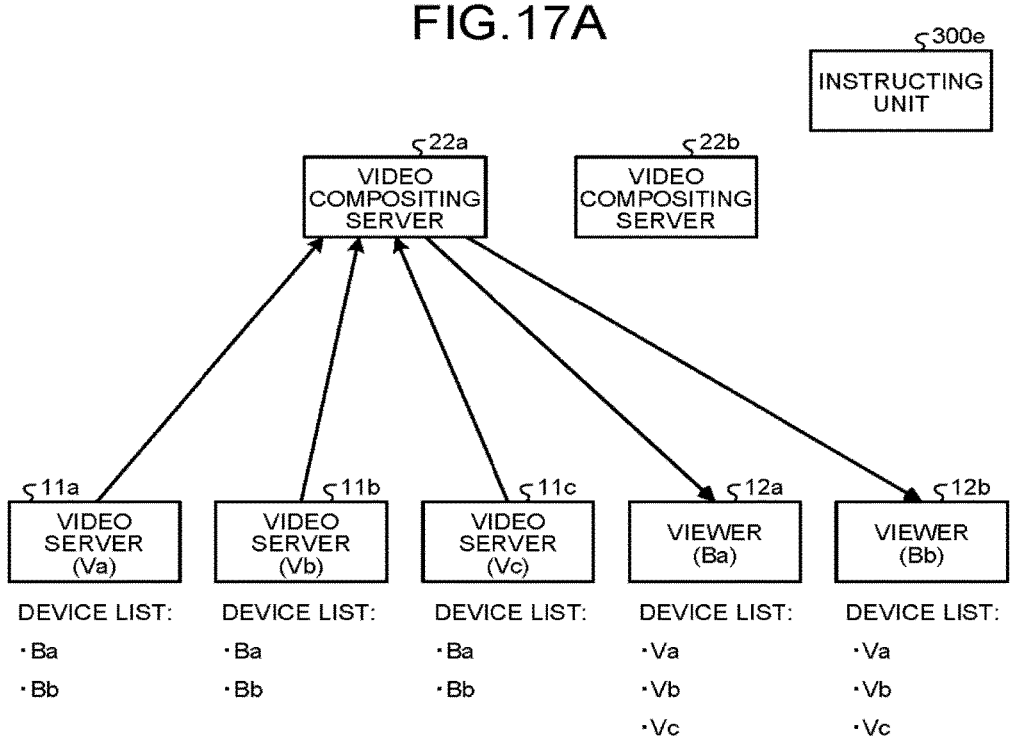
FIGS. 17A and 17B are diagrams for explaining connection establishment processing and connection termination processing performed by a video compositing system according to another application example of the first embodiment.
Figure 17B:
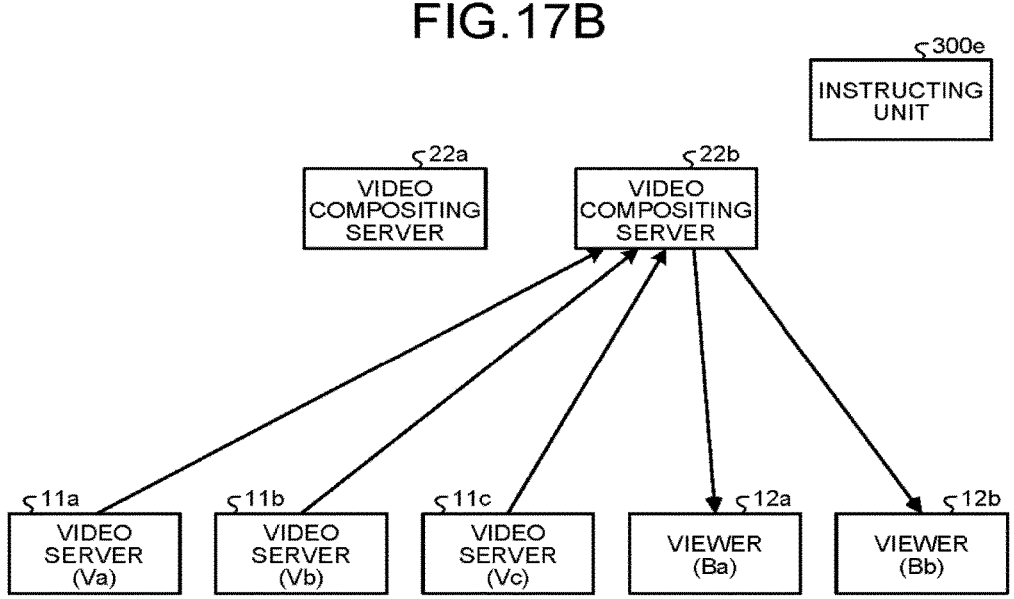

The following describes processing performed by the client devices to establish a connection and terminate a connection in the video compositing system according to the present application example of the first embodiment with reference to FIGS. 17A and 17B. In FIGS. 17A and 17B, video compositing servers 22a and 22b correspond to the relay servers 20 in FIG. 1. Video servers 11a, 11b, and 11c and viewers 12a and 12b correspond to the client devices 10 in FIG. 1. The video servers 11a, 11b, and 11c transmit the video sources 50a, 50b, and 50c, respectively. An instructing unit 300e transmits a shift instruction to the video servers 11a, 11b, and 11c and the viewers 12a and 12b.

The video servers 11a, 11b, and 11c have pieces of client identification information "Va", "Vb", and "Vc", respectively. The viewers 12a and 12b have pieces of client identification information "Ba" and "Bb", respectively. The following describes processing performed by the video servers 11a, 11b, and 11c and the viewers 12a and 12b to establish a connection with the video compositing server 22a, for example, with reference to FIG. 17A.

If the video compositing server 22a receives a connection establishment request from a client device of one type out of the two types of client devices of the video servers 11a, 11b, and 11c and the viewers 12a and 12b, the video compositing server 22a transmits a new connection notification to client devices of other type.

Let us assume a case where the video compositing server 22a receives a connection establishment request from the viewer 12a serving as a client device of the one type, for example. In this case, the video compositing server 22a transmits a new connection notification indicating that the viewer 12a is to be newly connected to the video compositing server 22b to the video servers 11a, 11b, and 11c serving as client devices of the other type based on stored corresponding relations. If the video servers 11a, 11b, and 11c receive the new connection notification of the viewer 12a, they update the respective device lists based on the client identification information "Ba" included in the received new connection request.

When the video servers 11a, 11b, and 11c and the viewers 12a and 12b establish connections with the video compositing server 22a, for example, the device managing unit 106 of the video servers 11a, 11b, and 11c stores therein the device list including the pieces of client identification information "Ba" and "Bb" on the viewers 12a and 12b, respectively. The device managing unit 106 of the viewers 12a and 12b stores therein the device list including the pieces of client identification information "Va", "Vb", and "Vc" on the video servers 11a, 11b, and 11c, respectively. The video compositing server 22a stores therein corresponding relations between the video servers 11a, 11b, and 11c and the viewers 12a and 12b.

The video servers 11a, 11b, and 11c and the viewers 12a and 12b perform the processing to terminate connections with the video compositing server 22a, for example, in the same manner as described above. Specifically, if the video compositing server 22a receives a removal notification from a client device of one type out of the two types of client devices of the video servers 11a, 11b, and 11c and the viewers 12a and 12b connected to the video compositing server 22a, the video compositing server 22a transmits the removal notification to client devices of other type.

Let us assume a case where the video compositing server 22a receives a removal notification from the viewer 12a serving as a client device of the one type, for example. In this case, the video compositing server 22a transmits a removal notification indicating to the effect that the viewer 12a is to be removed to the video servers 11a, 11b, and 11c serving as client devices of the other type based on the stored corresponding relations. If the video servers 11a, 11b, and 11c receive the removal notification of the viewer 12a, they update the respective device lists based on the client identification information "Ba" included in the received removal notification.

If the video servers 11a, 11b, and 11c and the viewers 12a and 12b receive a shift instruction from the instructing unit 300e, they perform the processing from Step S101 on in FIG. 11. The video servers 11a, 11b, and 11c and the viewers 12a and 12b thus perform the processing for shifting connections from the video compositing server 22a to which they are connected to the video compositing server 22b serving as a destination, for example (see FIG. 17B).

Second Embodiment

The following describes a second embodiment. The client device 10 according to the first embodiment and the modifications thereof transmits the transmission termination notification in the switching of the relay servers 20. By contrast, the client device 10 in the communication system according to the second embodiment adds a value that uniquely varies based on a predetermined rule, such as a serial number in ascending order, to a message to be transmitted without transmitting the transmission termination notification. Based on the serial number, the client device 10 detects completion of switching of the relay servers 20.

Figure 18:
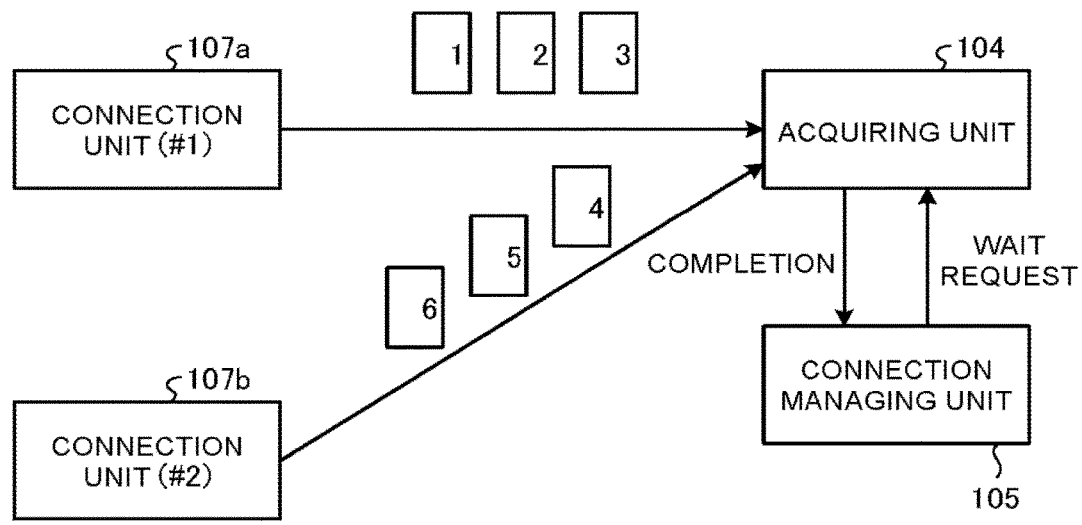
FIG. 18 is a diagram for explaining communication processing according to a second embodiment.

The following describes the communication processing according to the second embodiment with reference to FIG. 18. The communication system according to the second embodiment has the same configuration as that of the communication system according to the first embodiment described with reference to FIG. 1. FIG. 18 illustrates components of the client device 10 greatly relating to the operation according to the second embodiment (the acquiring unit 104, the connection managing unit 105, the connection units 107a, and the connection unit 107b illustrated in FIGS. 5 and 6). The communication processing is described below appropriately with reference to FIGS. 1, 5, and 6.

In the example illustrated in FIG. 18, the processing to Step S108 in FIG. 11 is performed, for example. Specifically, assume that the connection unit 107a is connected to the relay server 20 serving as an origin, and the connection unit 107b is connected to the relay server 20 serving as a destination.

The distributing unit 102 illustrated in FIG. 5 adds a serial number (sequence number) for identifying the order of messages to a message transmitted from the message generating unit 101. Transmission of data via the network 40 is typically carried out by a packet unit by dividing the data into a predetermined size and adding header information or the like thereto. The distributing unit 102, for example, generates the sequence numbers for the respective packets and stores them in headers. In the following description, the sequence number is a value incremented by 1.

In FIG. 18, the acquiring unit 104 extracts the sequence number from the received message and checks that the value of the extracted sequence number sequentially increases in each message. After the connection managing unit 105 issues a switching instruction to the distributing unit 102 at Step S108 in FIG. 11, the connection managing unit 105 issues a wait request to the acquiring unit 104 as illustrated in FIG. 18.

The acquiring unit 104 monitors the sequence numbers added to the messages transmitted from the connection unit 107a and the connection unit 107b. The acquiring unit 104 waits until it receives, from the connection unit 107b, a message (message having a sequence number "4") next to a sequence number ("3" in this example) of the last message received from the connection unit 107a. Specifically, the acquiring unit 104 waits until it receives, from the connection unit 107b, a message with a sequence number having a value larger by 1 than the largest sequence number out of the sequence numbers added to the messages received from the connection unit 107a.

If the acquiring unit 104 receives the message, the acquiring unit 104 determines that switching from the connection unit 107a to the connection unit 107b is completed and returns the processing to the connection managing unit 105. The connection managing unit 105 issues a connection termination request for the connection unit 107a connected to the relay server 20 serving as an origin. With this process, the connection managing unit 105 can determine that no more message is to be transmitted hereafter from any communication partner to the client device 10 via the connection unit 107a.

Figure 19:
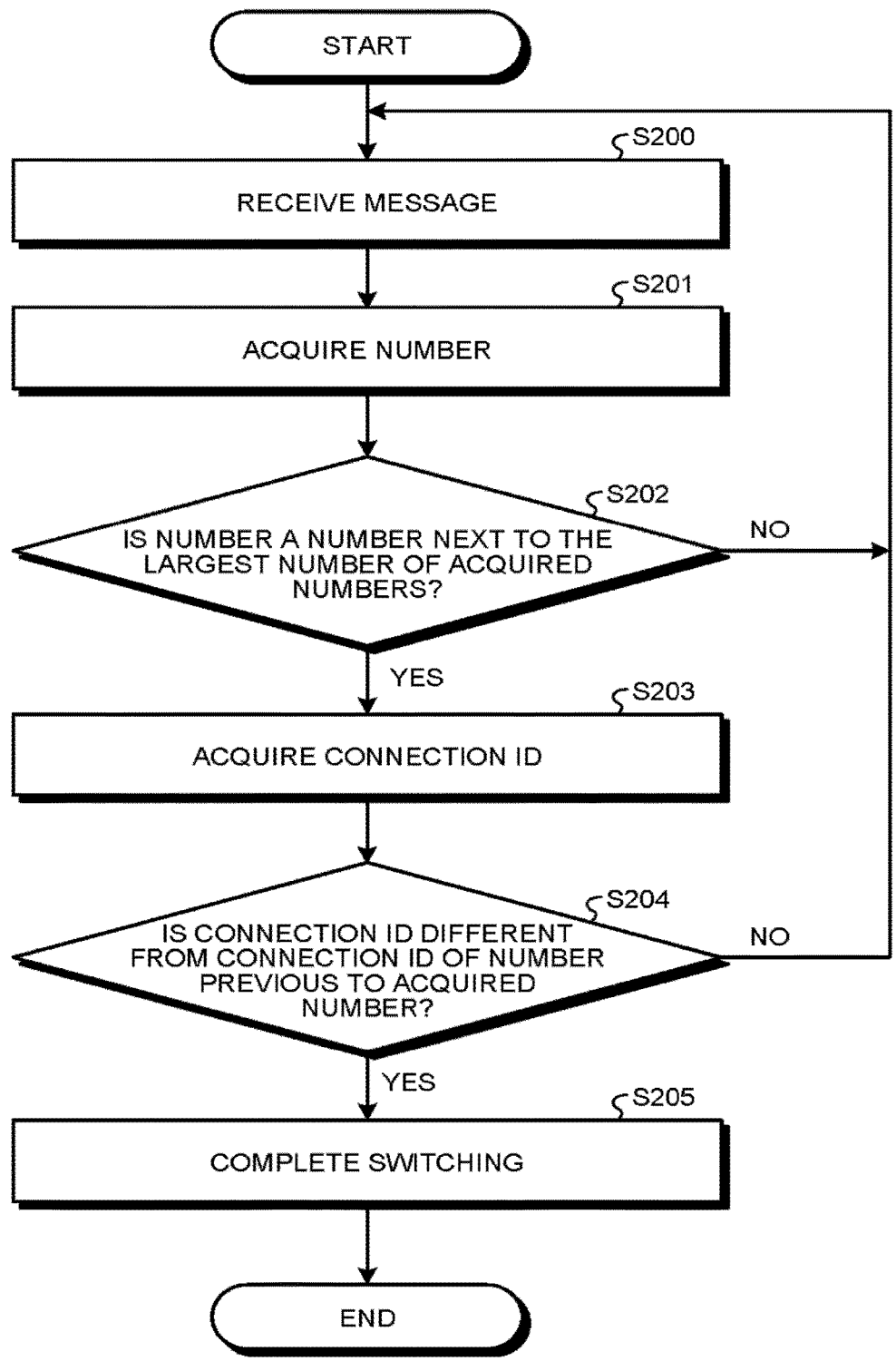
FIG. 19 is an exemplary flowchart of processing performed by an acquiring unit according to the second embodiment.

FIG. 19 is an exemplary flowchart of the processing performed by the acquiring unit 104 according to the second embodiment. At Step S200, the acquiring unit 104 receives a message from the connection unit 107a or the connection unit 107b. At Step S201, the acquiring unit 104 acquires the sequence number added to the received message.

At Step S202, the acquiring unit 104 determines whether the sequence number acquired at Step S201 is a number (number having a value larger by 1) next to the largest sequence number of the acquired sequence numbers. If the acquiring unit 104 determines that the sequence number is not the number next to the largest sequence number (No at Step S202), the processing is returned to Step S200, and the acquiring unit 104 performs the processing on the next message.

On the other hand, if the acquiring unit 104 determines that the sequence number is the number next to the largest sequence number (Yes at Step S202), the processing is shifted to Step S203. At Step S203, the acquiring unit 104 acquires source information (connection ID) indicating whether the message with the sequence number is received from the connection unit 107a or the connection unit 107b. The acquiring unit 104 stores the source information associated with the sequence number acquired at Step S201 in the RAM 1002 or the like.

At Step S204, the acquiring unit 104 compares the source information acquired at Step S203 with the source information associated with a sequence number (number having a value smaller by 1) previous to the sequence number acquired at Step S201 to determine whether the pieces of source information indicate different sources. In a case where the source information (connection ID) acquired at Step S203 indicates the connection unit 107b, and the source information associated with the previous sequence number indicates the connection unit 107a, for example, the acquiring unit 104 determines that the sources are different. If the acquiring unit 104 determines that the sources are the same (No at Step S204), the processing is returned to Step S200.

By contrast, if the acquiring unit 104 determines that the sources are different (Yes at Step S204), the processing is shifted to Step S205. At Step S205, the acquiring unit 104 notifies the connection managing unit 105 of completion of switching. The processing at Step S205 corresponds to the processing from Step S109 to Step S111 in FIG. 11, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device configured to perform communications with one or more devices via a relay server, the communication device comprising a connection managing unit configured to establish, when switching a connection destination from a first relay server serving as an origin to a second relay server serving as a destination, a connection with the second relay server, switch a transmission destination of a message from the first relay server to the second relay server, and cut a connection with the first relay server, wherein the connection managing unit transmits an establishment completion notification indicating that establishment of the connection with the second relay server is completed to the first relay server after the connection with the second relay server is established, the connection managing unit switches the transmission destination of the message from the first relay server to the second relay server when receiving the establishment completion notification of the one or more devices from the first relay server;

the communication device further comprising a device managing unit configured to manage information indicating the one or more devices serving as a communication destination, the connection managing unit receives the establishment completion notification based on the information managed by the device managing unit, and the connection managing unit switches the transmission destination of the message from the first relay server to the second relay server when receiving the establishment completion notification from all of one or more devices corresponding to the information managed by the device managing unit.

2. The communication device according to claim 1, wherein the connection managing unit transmits a transmission termination notification to the first relay server after switching the transmission destination of the message from the first relay server to the second relay server and cuts the connection with the first relay server when receiving the transmission termination notification of the one or more devices from the first relay server.

3. The communication device according to claim 2, wherein the connection managing unit transmits, to the one or more devices, a new connection notification including identification information for identifying the communication device when establishing the connection with the second relay server, and the device managing unit updates the information based on the new connection notification transmitted from the one or more devices.

4. The communication device according to claim 2, wherein the connection managing unit transmits, to the one or more devices, a removal notification including identification information for identifying the communication device when cutting the connection with the first relay server, and the device managing unit updates the information based on the removal notification transmitted from the one or more devices.

5. The communication device according to claim 1, wherein the connection managing unit transmits, to the one or more devices, a new connection notification including identification information for identifying the communication device when establishing the connection with the second relay server, and the device managing unit updates the information based on the new connection notification transmitted from the one or more devices.

6. The communication device according to claim 1, wherein the connection managing unit transmits, to the one or more devices, a removal notification including identification information for identifying the communication device when cutting the connection with the first relay server, and the device managing unit updates the information based on the removal notification transmitted from the one or more devices.

7. A communication device, configured to perform communications with one or more devices via a relay server, the communication device comprising a connection managing unit configured to establish, when switching a connection destination from a first relay server serving as an origin to a second relay server serving as a destination, a connection with the second relay server, switch a transmission destination of a message from the first relay server to the second relay server, and cut a connection with the first relay server, wherein the connection managing unit transmits an establishment completion notification indicating that establishment of the connection with the second relay server is completed to the first relay server after the connection with the second relay server is established, the connection managing unit switches the transmission destination of the message from the first relay server to the second relay server when receiving the establishment completion notification of the one or more devices from the first relay server;

the message is transmitted together with a value increased by a predetermined increment, and the connection managing unit determines, when a second message, having a value increased by the predetermined increment with respect to a maximum value added to a first message already received, is received from the one or more devices, whether the transmission destination of the first message and the transmission destination of the second message are different, and cuts the connection with the first relay server when the transmission destination of the first message and the transmission destination of the second message are different.

8. A communication device configured to perform communications with one or more devices via a relay server, the communication device comprising a connection managing unit configured to establish, when switching a connection destination from a first relay server serving as an origin to a second relay server serving as a destination, a connection with the second relay server, switch a transmission destination of a message from the first relay server to the second relay server, and cut a connection with the first relay server, wherein the connection managing unit transmits an establishment completion notification indicating that establishment of the connection with the second relay server is completed to the first relay server after the connection with the second relay server is established, and the connection managing unit switches the transmission destination of the message from the first relay server to the second relay server when receiving the establishment completion notification of the one or more devices from the first relay server;

the communication device further comprising a device managing unit configured to manage information indicating the one or more devices serving as a communication destination, the connection managing unit receives the establishment completion notification based on the information managed by the device managing unit, the connection managing unit transmits, to the one or more devices, a new connection notification including identification information for identifying the communication device when establishing the connection with the second relay server, and the device managing unit updates the information based on the new connection notification transmitted from the one or more devices.

* * * * *